(12) United States Patent
Leung

(10) Patent No.: US 6,195,705 B1
(45) Date of Patent: Feb. 27, 2001

(54) MOBILE IP MOBILITY AGENT STANDBY PROTOCOL

(75) Inventor: Kent K. Leung, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/107,701

(22) Filed: Jun. 30, 1998

(51) Int. Cl.⁷ .......................... G06F 15/16; G06F 15/173
(52) U.S. Cl. .................. 709/245; 709/202; 709/239; 709/229; 709/317; 370/331; 455/426
(58) Field of Search ................ 370/331, 338, 370/312; 709/238, 245, 202, 218, 219, 220, 225, 226, 229, 230, 239, 242, 249, 317, 316; 455/426, 433, 435, 31.3, 151.2, 422, 424, 425, 554, 560; 379/170, 55.1, 56.3, 56.1; 340/825.27

(56) References Cited

U.S. PATENT DOCUMENTS

| | | | |
|---|---|---|---|
| 4,692,918 | 9/1987 | Elliott et al. | 370/85 |
| 5,016,244 | 5/1991 | Massey et al. | 370/16 |
| 5,018,133 | 5/1991 | Tsukakoshi et al. | 340/825.05 |
| 5,218,600 | 6/1993 | Schenkyr et al. | 370/16 |
| 5,371,852 | 12/1994 | Attanasio et al. | 395/200 |
| 5,473,599 | 12/1995 | Li et al. | 370/16 |
| 5,572,528 * | 11/1996 | Shuen | 370/402 |
| 5,619,552 * | 4/1997 | Karppanen et al. | 455/433 |
| 5,729,537 * | 3/1998 | Billstrom | 370/329 |
| 5,825,759 * | 10/1998 | Liu | 370/331 |
| 5,862,345 * | 1/1999 | Okanoue et al. | 709/238 |
| 6,078,575 * | 6/2000 | Dommety et al. | 370/338 |

OTHER PUBLICATIONS

DHCP for Mobile Networking with TCP/IP, Perkins, C.E. and Jagannadh T., IBM, T.J. Watson Research Center, IEEE, Apr. 1995.*

DHCP for Mobile Networking with TCP/IP, Perkins, C.E. and Jagannadh T., IBM, T.J. Watson Research Center, IEEE, Apr. 1995.*

Release notes for 3Com Corporation, "Conducting a Redundant Route for Network Resiliency," Mar. 1994, *NET Builder Family Bridge/Router* pp. 26–29.

J. Moy, RFC 1247"OSPF Version 2," Jul. 19, 1991.

D. Oran RFC 1142 "OSI IS–IS Intra–domain Routing Protocol," Feb. 1990.

Uyless Black, "TCP/IP and Related Protocols," 1992, *McGraw–Hill, Inc.*, pp. 226–249.

T. Li, et al, RFC 2281"Cisco Hot Standby Router Protocol (HSRP)," Mar. 1998.

Chambless, et al., "Home Agent Redundancy Protocol (HARP)," Oct. 27, 1997.

Network Working Group, RFC 2002 "IP Mobility Support," Oct. 1996.

* cited by examiner

Primary Examiner—Mark H. Rinehart
Assistant Examiner—Beatriz Prieto
(74) Attorney, Agent, or Firm—Beyer Weaver & Thomas, LLP

(57) ABSTRACT

Disclosed is a method and apparatus for automatically backing up a Home Agent in Mobile IP. The method employs important components of the widely-used Hot Standby Router Protocol, but extends it to include synchronization of the mobility binding table between an active Home Agent and a standby Home Agent that backs it up. Also disclosed is a more general protocol for extending HSRP and related redundancy protocols to synchronize higher level functions other than mobility binding lists in Mobile IP (e.g., address translation tables in Network Address Translation (NAT), address bindings in Dynamic Host Configuration Protocol (DHCP) servers, dynamic ACL in Reflexive Access List, and TCP and GTP layer context in GPRS support nodes: SGSN & GGSN). Still other protocols that could benefit from HSRP include Lock and Key, Context-Based Access List, IP Security (IPSec), and H.323 gatekeeper.

31 Claims, 13 Drawing Sheets

| | MN ADDRESS | HOME AGENT ADDRESS | C.O. ADDRESS | IDENTIFICATION FIELD | LIFETIME GRANTED | REMAINING TIME OF REGISTRATION | SERVICE FIELD |
|---|---|---|---|---|---|---|---|
| REG. 1 | 1.0.0.1 | 1.0.3.0 | 2.0.0.0 | 2 | 4:00 HOURS | 3:35 | 000011xx GB |
| REG. 2 | 2.0.3.4 | 1.0.3.0 | 1.0.4.8 | 3 | 1:00 HOUR | 0:08 | 000100xx B |
| REG. 3 | 1.0.2.4 | 1.0.3.0 | 2.0.0.0 | 5 | 2:00 HOURS | 1:19 | 000010xx G |

FIGURE 5

STATE

| Event | Virgin | Learn | Listen | Speak | Standby | Active |
|---|---|---|---|---|---|---|
| 1 config | StartAT StartST Learn or Listen? | | | | | |
| 2 unconfig | ClearAT ClearST Virgin | ClearAT ClearST Virgin | ClearAT ClearST Virgin | ClearAT ClearST Virgin | ClearAT ClearST Virgin | ClearAT ClearST Resign Virgin |
| 3 ATexp | | | StartAT StartST Speak | | Clear AT Active | |
| 4 Higher Hello | | | | Listen | StartST Listen | |
| 5 Higher Hello | | snoop StartAT StartST Listen | snoop StartAT | snoop StartAT | snoop StartAT | StartAT StartST Speak |
| 6 Lower Active | | snoop StartAT StartST Listen | snoop StartAT Coup ClearAT? Active? StartsST | snoop StartAT Coup ClearAT? Active? StartsST | snoop StartAT Coup ClearAT? Active? | Coup |
| 7 Resign | | | StartAT StartST Speak | StartAT | ClearAT Active | |
| 8 Coup | | | | | | Resign StartAT StartST Speak |
| 9 STexp | | | StartST Speak | Clear ST Standby | | |
| 10 Higher Standby | | | StartST | StartST Listen | StartST Listen | StartST |
| 11 Lower Standby | | | StartST Speak | ClearST Standby | | StartST |

FIGURE 10

MOBILE IP MOBILITY AGENT STANDBY PROTOCOL

BACKGROUND OF THE INVENTION

This invention relates to Mobile IP network technology. More particularly, the invention relates to redundancy protocols and apparatus for protecting a Mobile IP system from failure due to the loss of a Home Agent ("HA") or Foreign Agent ("FA").

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and will soon be implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1A. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When such Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1A, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1A, it may be connected through another router (a router R1 in this case). Router R1 may, in turn, connect one or more other routers (e.g., a router R3) with the internet.

Now, suppose that Mobile Node 6 is removed from its home base network segment 12 and roams a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the Foreign Agent's IP address in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node of for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The C.O. address is the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

FIG. 1B illustrates a significant problem with the Mobile IP system 2. If Home Agent 8 fails or otherwise become inoperative (due to a power failure, rebooting, scheduled maintenance, etc.), Mobile Node 6 is left without the ability to (1) receive new internet messages addressed to it at network segment 12 and (2) register with other Foreign Agents. In effect, Mobile Node 6 is cut-off from internet connection when Home Agent 8 goes down. This problem may extend to other Mobile Nodes supported by Home Agent 8. Often, a given Home Agent will be responsible for servicing numerous Mobile Nodes which may be based at sub-network 12.

As shown in FIG. 1B, when Home Agent 8 fails, not only is network segment 12 disconnected from the internet, but Mobile Nodes at remote locations are also blocked from the registration and packet receipt functions of Mobile IP. In some networks, there may be other routers connecting segment 12 to the internet. Such additional routers would allow fixed hosts on the segment to maintain their internet connections but would not allow remote access to Mobile Nodes. Similarly, if Foreign Agent 10 should fail, all Mobile Nodes visiting sub-network 14 lose connections, even though there may be other routers on that sub-network.

A redundancy protocol known as Hot Standby Router Protocol ("HSRP") is widely used to back up primary routers for a network segment. In HSRP, a "standby" or "secondary" router is designated as the back-up to an "active" or "primary" router. The standby router is linked to the network segment or segments serviced by the active router. The active and standby routers share a "virtual IP address" and possibly a "virtual Media Access Control (MAC) address." All internet communication to and from the relevant sub-network employs the virtual IP and MAC addresses. At any given time, the active router is the only router adopting the virtual addresses. Then, if the active router should cease operation for any reason, the standby router immediately takes over its load (by adopting the virtual addresses). Further details of HSRP can be found in RFC 2281, "Cisco Hot Standby Router Protocol (HSRP)" by T. Li, B. Cole, P. Morton, and D. Li and in U.S. Pat. No. 5,473,599 issued to Li and Cole on Dec. 5, 1995. Both of these references are incorporated herein by reference in their entireties and for all purposes.

If Home Agent 8 participated in a hot standby router protocol (together with other routers connected to segment 12), its failure would allow those nodes currently plugged into sub-network 12 to maintain their communications with internet 4. However, its failure would leave Mobile Node 6 stranded on network segment 14. HSRP has no mechanism for handling internet communications via Mobile IP. This is partly due to the fact that in Mobile P it is not enough to simply have a standby router ready to take over as active router. The Home Agent (active router) must carry-out higher level functions required by Mobile IP such as keeping track of the locations (and associated Foreign Agents) of the various Mobile Nodes for which it is responsible. Similarly, a Foreign Agent must keep track of visiting Mobile Nodes and their associated Home Agents.

One redundancy mechanism for Mobile IP has been proposed. It goes by the acronym HARP which stands for Home Agent Redundancy Protocol. It was presented in an Internet Engineering Task Force memo of Chambless and Binkley entitled "Home Agent Redundancy Protocol" and having a URL of ftp://ietf.org/internet-drafts/draft-chambless-mobileip-harp-00.txt. This protocol provides for a redundant or "peer" Home Agent which is intended to contain a record of the Mobile Node locations stored in the primary Home Agent. While this proposed protocol does provide a redundancy mechanism for Mobile IP Home Agents, it has certain short comings. Notably, it does not make use of a widely installed redundancy protocol such as HSRP. Therefore, to implement HARP, many enterprises must undertake a rather significant change to its existing network solution. More importantly, HARP is concerned only with Mobile IP. Many other network functions such as Network Address Translation ("NAT"), IP security, Reflexive Access List, etc. all could profit from router redundancy. However, each of these has its own specific high level requirements (analogous to the mobility binding table required for Mobile IP). HARP cannot be easily extended to these Non-Mobile IP network functions.

For the above reasons, an improved Home Agent redundancy protocol is required for Mobile IP.

SUMMARY OF THE INVENTION

The present invention provides a method and apparatus for automatically backing up a Home Agent or a Foreign Agent in Mobile IP. The invention employs important components of the widely-used Hot Standby Router Protocol, but extends it to include synchronization of the mobility binding table (or a visitor table in the case of a foreign agent) between an active Mobility Agent and a standby Mobility Agent that backs up the active Mobility Agent. Note that a "Mobility Agent" may be either a Home Agent or a Foreign Agent. The invention also provides a more general protocol for extending HSRP and related redundancy protocols to synchronize higher level dynamic functions other than mobility binding lists in Mobile IP (e.g., address translation tables in Network Address Translation (NAT), address bindings in Dynamic Host Configuration Protocol (DHCP) servers, dynamic ACL in Reflexive Access List, and TCP and GTP layer context in GPRS support nodes: SGSN & GGSN). Still other protocols that could benefit from HSRP include Lock and Key, Context-Based Access List, IP Security (IPSec), and H.323 gatekeeper.

One aspect of the invention provides a method of operating a standby Mobility Agent to provide Mobile IP redundancy. The method may be characterized as including the following sequence: (a) determining that an active Mobility Agent, with which the standby Mobility Agent shares a virtual IP address known to a Mobile Node, is no longer acting as a Mobility Agent for the Mobile Node; (b) assuming the role of active Mobility Agent for the shared virtual IP address, thereby handling a registration from the Mobile Node; and (c) sending a list of registrations currently handled by the active Mobility Agent to a new standby Mobility Agent. The standby Mobility Agent may determine that the active Mobility Agent is no longer acting as a Mobility Agent by various mechanisms. In one case, it receives a resign message from the active Mobility Agent. In another case, it determines that no hello message has been received from the active Mobility Agent within a predefined length of time. In yet another case, the standby Mobility Agent preempts the active Mobility Agent when it determines that it has a higher priority than the active Mobility Agent. When it takes over as active Mobility Agent, it adopts the virtual IP address and, preferably, a virtual MAC address as well.

While operating in its standby capacity, the standby Mobility Agent periodically receives registration entries from the active Mobility Agent by UDP, for example. When this occurs, the standby Mobility Agent adds the registration entries to its own mobility binding table (or visitor table), thereby keeping synchronized with the active Mobility Agent. And when the standby Mobility Agent initially assumes that status, it will receive an entire mobility binding table (or visitor table) specifying multiple registration entries from the active Mobility Agent.

In some embodiments, both the active and standby Mobility Agents will be able to tunnel packets or receive tunneled packets (in the case of Foreign Agents). However, the handling of new registrations will generally be left solely to the active Mobility Agent.

Another aspect of the invention provides a method of maintaining Mobile IP redundancy by the operation of an active Mobility Agent. This method may be characterized by the following sequence: (a) registering a Mobile Node; (b) creating a registration entry internally for the Mobile Node; and (c) sending a message (preferably unicast) notifying a standby Mobility Agent of the registration. In its active capacity, the active Mobility Agent periodically sends hello messages to the standby Mobility Agent, thereby notifying the standby Mobility Agent that the active Mobility Agent continues to function as the active Mobility Agent. The active Mobility Agent may also periodically send hello messages to a standby group of routers, each configured to act as an active Mobility Agent, thereby notifying the standby group that the active Mobility Agent continues to function as the active Mobility Agent. Still further, the active Home Agent may send a resign message to the standby Mobility Agent before resigning the post of active Mobility Agent.

The active Mobility Agent may also receive a request from the standby Mobility Agent to dump an entire mobility binding table (or visitor table) containing multiple registration entries from the active Mobility Agent to the standby Mobility Agent. When this occurs, the active Mobility Agent complies by dumping its mobility binding table (or visitor table) to the standby Mobility Agent, preferably via UDP.

Another aspect of the invention provides a network device (e.g., a router) which implements a generic method of providing redundancy for a network segment. The method synchronizes a dynamic function between an active and a standby device. It may be characterized by the following sequence: (a) assuming the status of standby router to backup an active router, with which the standby router shares a virtual IP address known to a host based at the network segment; (b) determining that the active router is no longer acting as an active router for the host; (c) assuming the role of active router for the shared virtual IP address, thereby handling packet exchange tasks for the host; and (d) apprising a new standby router of an entry to a dynamic list specifying the status of one or more hosts based at the network segment. Preferably, the updating is performed via UDP. Depending upon the function being backed up, the dynamic list may specify various items pertaining to the network status. For example, it may specify a registration for a Mobile IP Mobile Node, an address translation for a network node employing Network Address Translation, etc.

Still another aspect of the invention provides a router supporting Mobile IP. The router may be characterized as including the following features: (a) a memory; (b) a processor coupled to the memory; (c) one or more interfaces for sending and receiving data packets on a network. In this router, the memory and the processor are adapted to provide (a) a primary router address and (b) a group virtual address which is adopted by the router when it becomes the active Mobility Agent of the network segment, and wherein the memory and the processor are adapted to (c) send registration updates to a standby Mobility Agent from among the plurality of routers. The memory and processor are further adapted to assume a status of standby Mobility Agent for backing up the active Mobility Agent. Preferably the router also includes a priority specifying the router's relative likelihood of becoming the active Mobility Agent in comparison to other routers in the network segment.

These and other advantages of the present invention will become apparent to those skilled in the art upon a reading of the following descriptions of the invention in conjunction with the figures.

BRIEF DESCRIPTION OF THE DRAWINGS

FIG. 5 is an illustration of a mobility binding table as may used by an active Home Agent in accordance with an embodiment of this invention.

FIG. 10 is a chart showing the events which cause a router/Home Agent of FIG. 9 to change states.

DETAILED DESCRIPTION OF THE PREFERRED EMBODIMENTS

1. Overview

The present invention provides a method and apparatus for backing up active network entities such as active Home Agents or Foreign Agents in Mobile IP. In the following description, numerous specific details are set forth in order to fully illustrate a preferred embodiment of the present invention. It will be apparent, however, that the present invention may be practiced without limitation to some specific details presented herein. Further, for convenience, most of the discussion will focus on application of the invention to Home Agents. Many aspects of the invention are directly applicable to Foreign Agents as well. As mentioned, the term "Mobility Agent" covers both Home Agents and Foreign Agents.

Figure 1A:
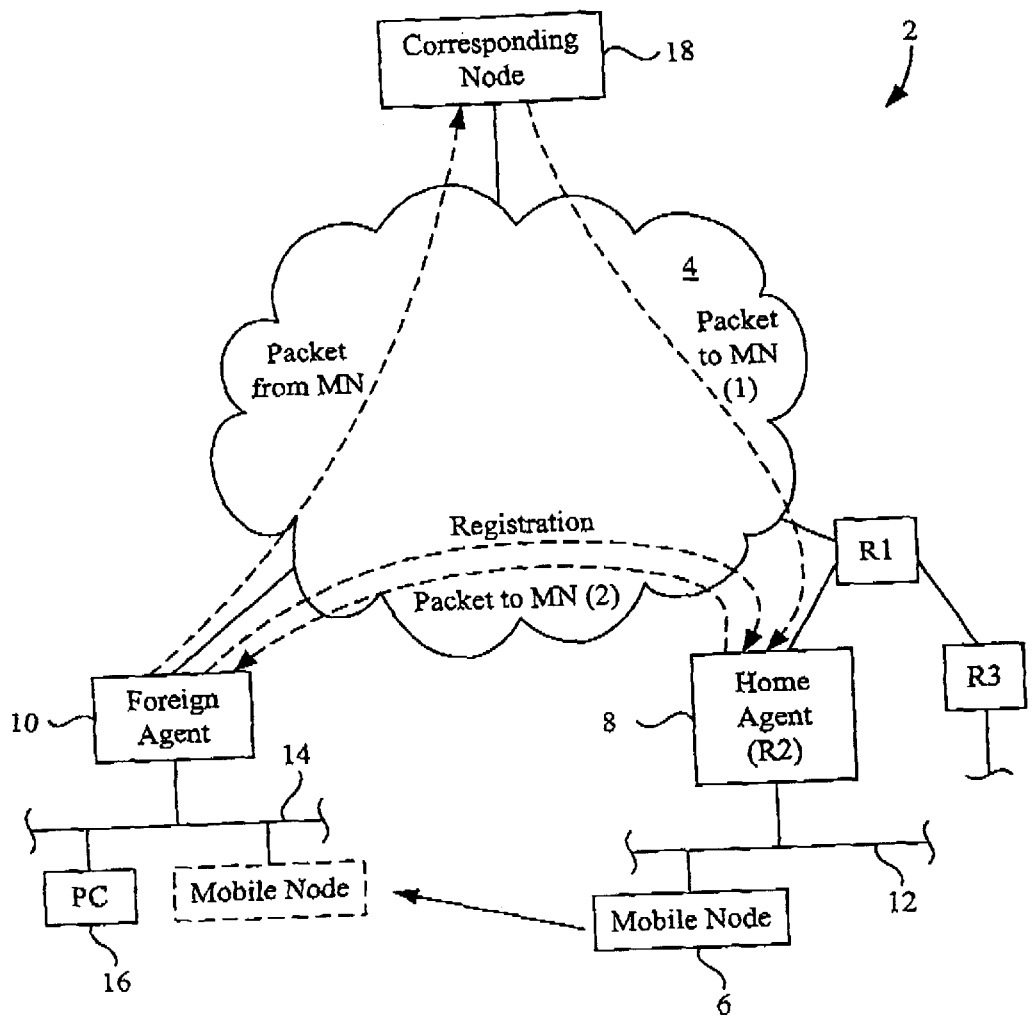
FIG. 1A is a diagram of a Mobile IP network segment and associated environment.
Figure 1B:
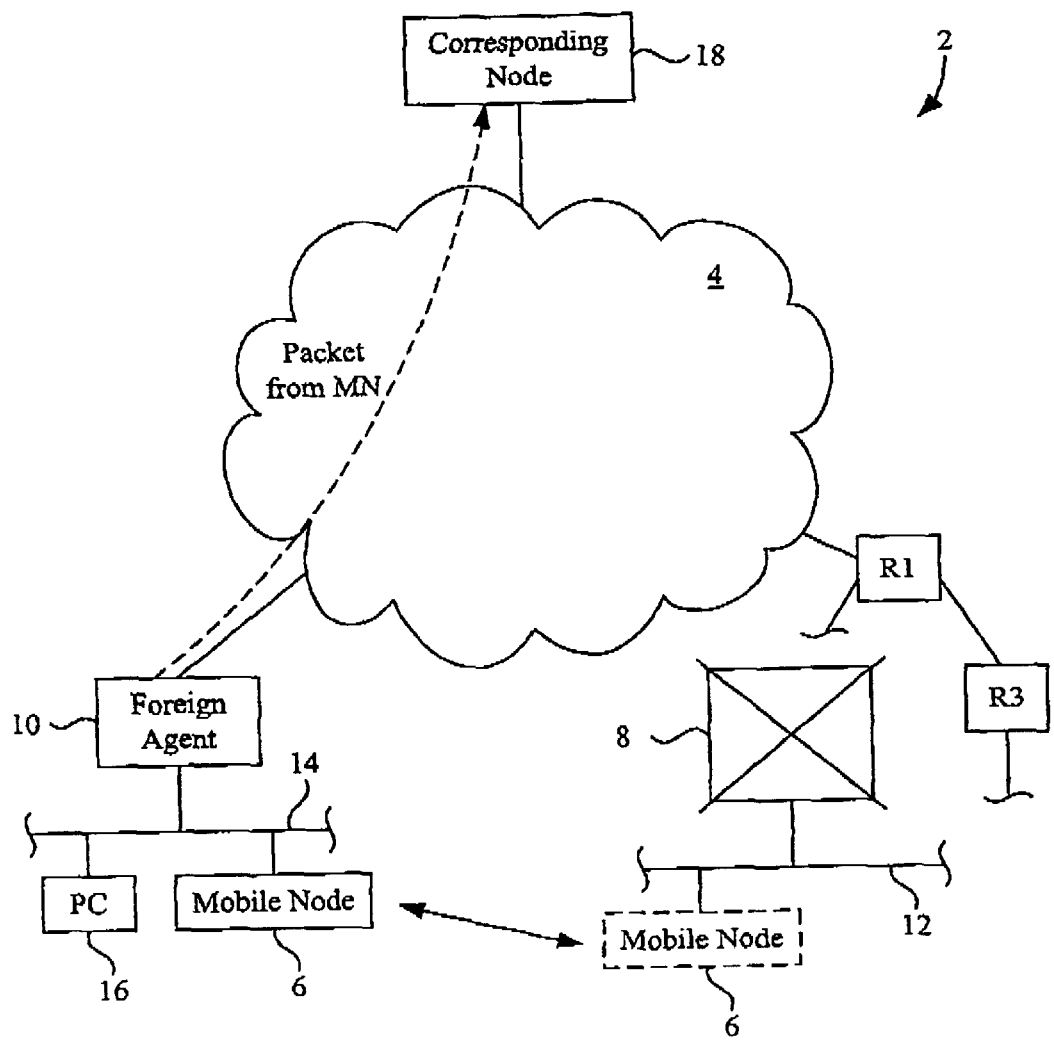
FIG. 1B is a diagram of the Mobile IP environment of FIG. 1A, depicting its limitations resulting from failure of a Home Agent.
Figure 2A:
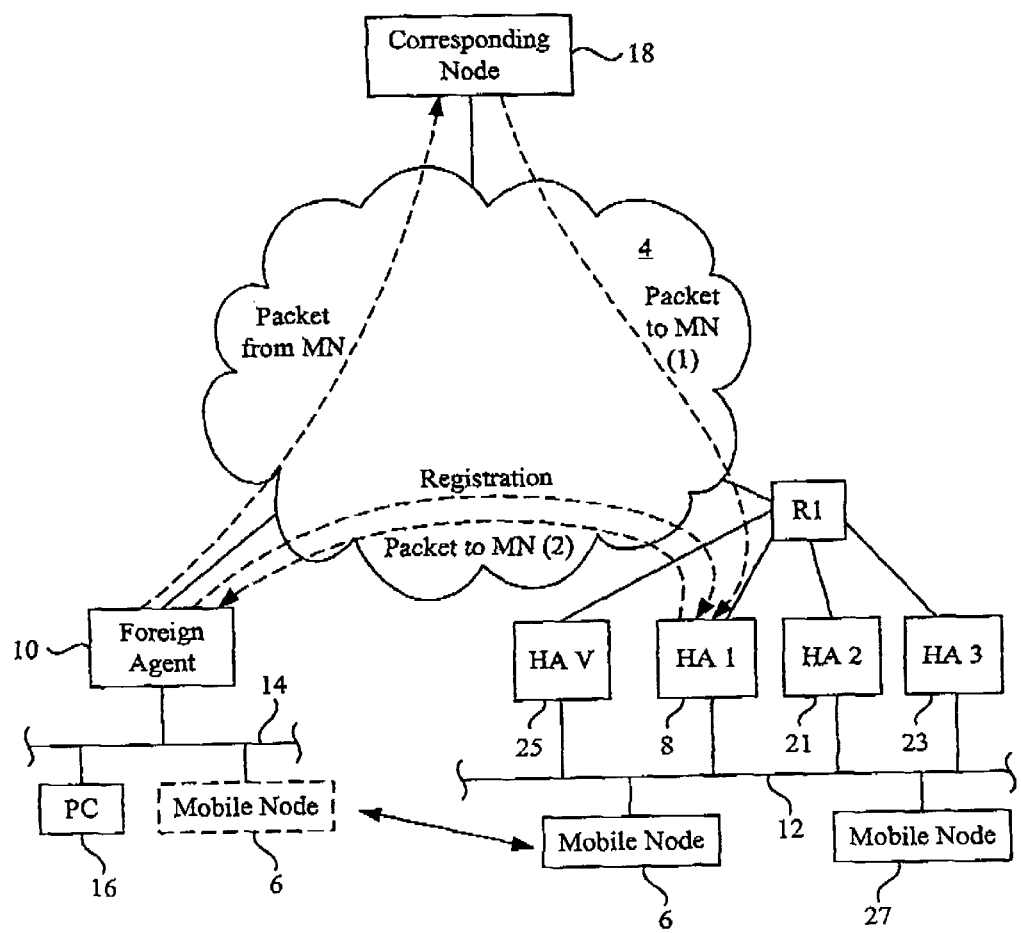
FIG. 2A is a diagram of a Mobile IP network segment and associated environment in accordance with this invention having a standby group of routers/Home Agents and a virtual Home Agent for the standby group.

FIG. 2A shows a Mobile IP environment as in FIG. 1, but modified to include a group of routers, any of which can function as a home agent, on network segment 12. Often network segment 12 provides a home base for several mobile nodes. It may also include dedicated or fixed nodes (e.g., desk top personal computers or work stations) that never move from network segment 12. In the interest of simplifying the figure, only node 6 and one other node (a mobile node 27) are shown. Segment 12 may be provided on any suitable medium such as coaxial cable, shielded and unshielded twisted pair wiring, fiber optic line, radio channels, and the like. A LAN comprised wholly or partially of segment 12 may assume a variety of topologies, including ring, bus, star, etc. Further, these LANs may have different physical configurations such as token ring (IEEE 802.5), ethernet (IEEE 802.3), and fiber distributed data interface or "FDDI" (ANSI X3T9.5), etc.

In this example, the group of physical routers on segment 12 includes router 8 (as illustrated in FIG. 1) together with two other routers (a router 21 and a router 23). Each of these routers may serve in a conventional role of routing packets to and from nodes on network segment 12. As is well understood in the field, a "packet" is a collection of data and control information including source and destination node addresses, formatted for transmission from one node to another.

Note that each of physical routers 8, 21, and 23 is connected to the internet (or a WAN) 4 through another router R1. This configuration is provided as an example. Numerous other router/bridge arrangements between cloud 4 and network segment 12 are likely to be encountered in practice. For example, any or all of routers 8, 21, and 23 may be directly connected to the internet, without connecting through edge router R1. The exact configuration depends on the complexity of the network or networks serviced by the routers and the preferences of the organization installing and administering the network(s).

Each of routers 8, 21, and 23 is configured with the ability to act as a Home Agent for the mobile nodes based on network segment 12. Note that router 8 is given the designation "Home Agent 1," router 21 is given the designation "Home Agent 2," and router 23 is given the designation "Home Agent 3." Each of these routers/Home Agents includes the hardware and/or software necessary to carry out the functions required of a Home Agent in Mobile IP (as specified in RFC 2002, for example). At any given time, however, only one of routers 8, 21, and 23 is the "active" Home Agent which fields registration requests and tunnels packets to Foreign Agents on behalf of Mobile Nodes on segment 12. One of the other routers serves as a "standby" Home Agent which automatically takes over as active Home Agent, should the currently active Home Agent cease to function as Home Agent. The standby Home Agent may also tunnel some packets to registered Mobile Nodes, but does not handle new registrations. Handling registrations is reserved for the active Home Agent.

Collectively, the routers/Home Agents on segment 12 assume the role of a virtual Home Agent 25. At any one time, one of the routers/Home Agents assumes the state of active Home Agent, a condition requiring that it emulate the virtual Home Agent. Mobile nodes and Foreign Agents know only virtual Home Agent 25, regardless of which physical router (HA1, HA2, or HA3) is currently emulating it. Virtual Home Agent 25 is not a physical router, but a facade adopted by one of the routers/Home Agents in the group—and only while that router serves as the active Home Agent. When an active Home Agent ceases to function as the active Home Agent, the virtual Home Agent persona is automatically adopted by the standby Home Agent.

In this example, if the router/Home Agent HA1 is initially the active Home Agent, a corresponding node will send packets through HA1, HA2, or HA3, depending upon the routing protocol. This avoids the need for redirects and provides implicit load balance. However, a Foreign Agent will send registration requests through HA1 only. This is because HA1 has adopted the MAC and network layer addresses of HAV 25. Further, if router/Home Agent HA2 is the standby Home Agent, a failure by HA1 will cause HA2 to become the active router automatically. After such failure, the Mobile Nodes will continue sending registrations to the IP addresses of HAV 25 even though those packets are now handled by a different physical router/Home Agent. Packets to the Mobile Node will be tunneled by either the active or standby Home Agent.

When a standby Home Agent takes over for an inoperative active Home Agent, a new standby Home Agent is automatically selected from among the other potential Home Agents in the group—assuming that there are more than two routers/Home Agents in the group. Any router/Home Agent in a standby group can assume the roles of standby or active Home Agent. Each router in a group may be configured with a priority to facilitate election to these posts.

In an alternative embodiment, a new router/Home Agent within the group may attempt to preempt the current standby or active router/Home Agent if it believes that it meets the conditions necessary to perform as standby or active router/Home Agent. In this case, the new router/Home Agent first determines whether it has "priority" over the current standby or active Home Agent (explained below). If so, it issues a coup message and the current standby or active Home Agent resigns, whereupon the new router takes over the status of standby or active Home Agent. Preferably, the present invention provides a mechanism by which the preempt capability (ability to coup) can be switched off so that the new router does not automatically take over as active Home Agent when it enters the network group. This new feature is desirable because network operation may be delayed for a short period while the coup takes place. Thus, the ability to switch off the preempt capability may prevent unnecessary system delays.

Virtual Home Agent 25 may include a network layer address (e.g., an IP address) and a MAC address. It may also include the ability to transfer information regarding protocol specific functioning of the currently active Home Agent to the standby Home Agent. Such information may include a list of Mobile Node registrations. Whenever one of the physical routers/Home Agents on segment 12 becomes the active Home Agent (and emulates the virtual Home Agent), it adopts the network layer and MAC addresses as well as the other functions of virtual Home Agent 25 (e.g., keeping the standby Home Agent informed of the current mobility binding table). During this time, the active Home Agent may maintain its own addresses (associated with HA1, HA2, or HA3, but not HAV).

This redundancy protocol applies to Foreign Agents as well as Home Agents. Thus, for example, Foreign Agent 10 on segment 14 may participate with other appropriately configured routers on segment 14 in a redundancy protocol which provides for active and standby Foreign Agents as described above. In such cases, the active Foreign Agent synchronizes a visitor table of the standby Foreign Agent to continue service to roaming Mobile Nodes.

Figure 2B:
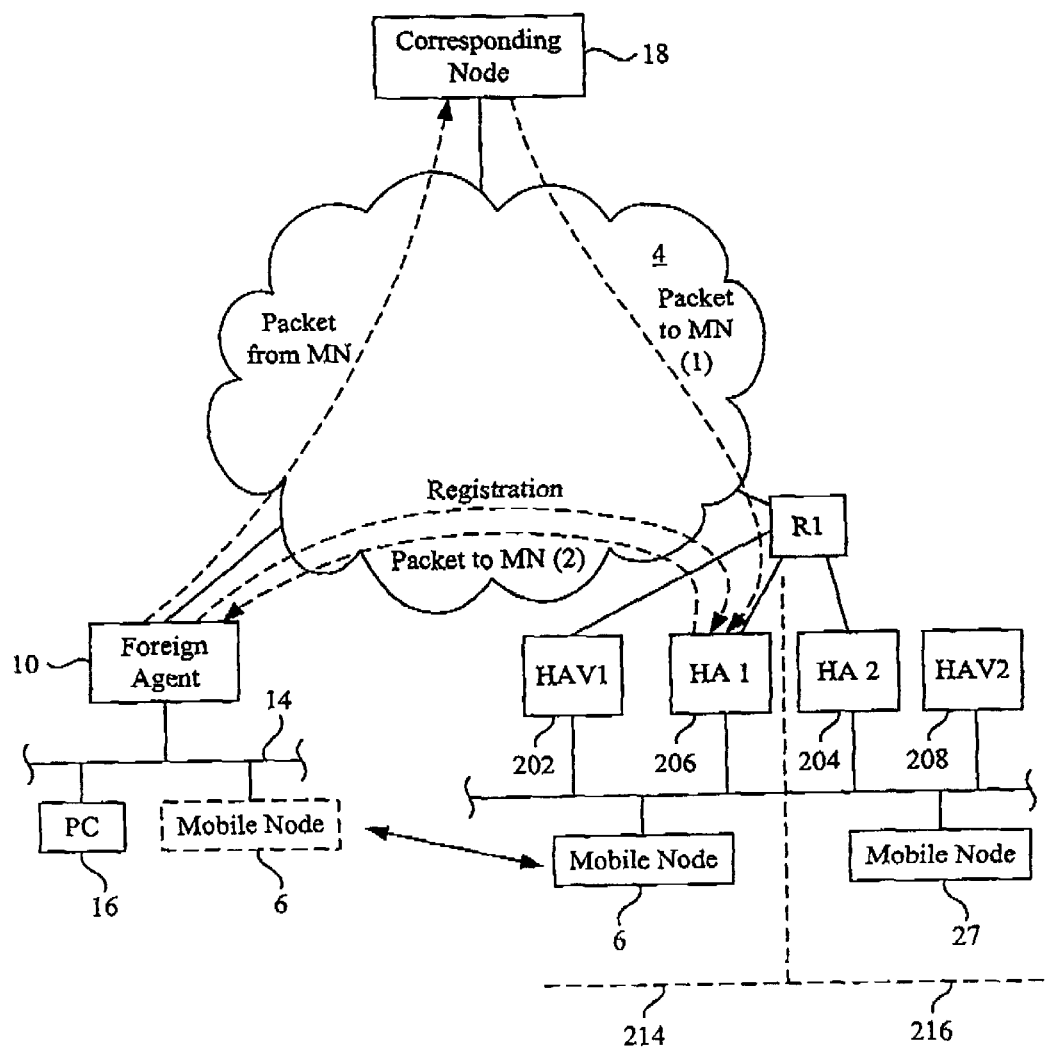
FIG. 2B is a diagram of two Mobile IP network segments and associated environment in accordance with this invention having two standby groups each with its own virtual Home Agent but sharing some routers/Home Agents in their standby groups.

In some situations, a given router/Home Agent may exist in two different groups. For example, in FIG. 2B, the nodes on a network segment 212 are divided into at least two groups: a group 214 and a group 216. Each of these sections has its own standby group of Home Agents, but employs those agents from the adjacent network group. For example, group 214 employs a virtual Home Agent (HAV1) 202 having associated MAC and IP addresses. Normally, the active Home Agent emulating HAV1 202 is HA1 206 on network segment 212. A standby Home Agent for group 214 is a Home Agent (HA2) 204 which normally serves as the active Home Agent for group 216. If active Home Agent 206 should fail, then standby Home Agent 204 would assume the role of active Home Agent for group 214 (by emulating HAV1 202), while maintaining its role in servicing group 216. The Home Agent of group 216 is represented by a virtual Home Agent (HAV2) 208. HA2 204 is normally the active router, emulating HAV2. The standby Home Agent for group 216 is HAV1 206. If active Home Agent 204 should fail, standby Home Agent 206 would automatically take over, while maintaining its role in servicing group 214. In theory, such a router/Home Agent could be a member of as many groups as the number of additional MAC addresses it could adopt.

Other topologies are, of course, possible and sometimes desirable. For example, a site may contain three routers (routers A, B, and C) and two virtual Home Agents (HAV1 and HAV2). Routers A and B could serve as active Home Agents for HAV1 and HAV2, respectively. Router C could serve as the standby Home Agent for both HAV1 and HAV2. Note that HAV1 and HAV2 have the same or different subnet addresses. In a very simplistic example of two virtual Home Agents sharing a subnet address, the address of HAV1 might be, 1.0.0.1 while the address of HAV2 might be 1.0.0.2. In a comparable example with two virtual Home Agents not sharing a subnet address, the address of HAV1 might be, 1.0.0.1 while the address of HAV2 might be 2.0.0.1.

The apparatus (Home Agent) of this invention may be specially constructed for the required purposes, or it may be a general purpose programmable machine selectively activated or reconfigured by a computer program stored in memory. The processes presented herein are not inherently related to any particular router or other apparatus. In particular, various general purpose machines may be used with programs written in accordance with the teachings herein, or it may be more convenient to construct a more specialized apparatus to perform the required method steps. For example, the Home and Foreign Agents of this invention may be specially configured routers such specially configured router models 2500, 2600, 3600, 4000, 4500, 4700, 7200, and 7500 available from Cisco Systems, Inc. of San Jose, Calif. A general structure for some of these machines will appear from the description given below.

Figure 3:
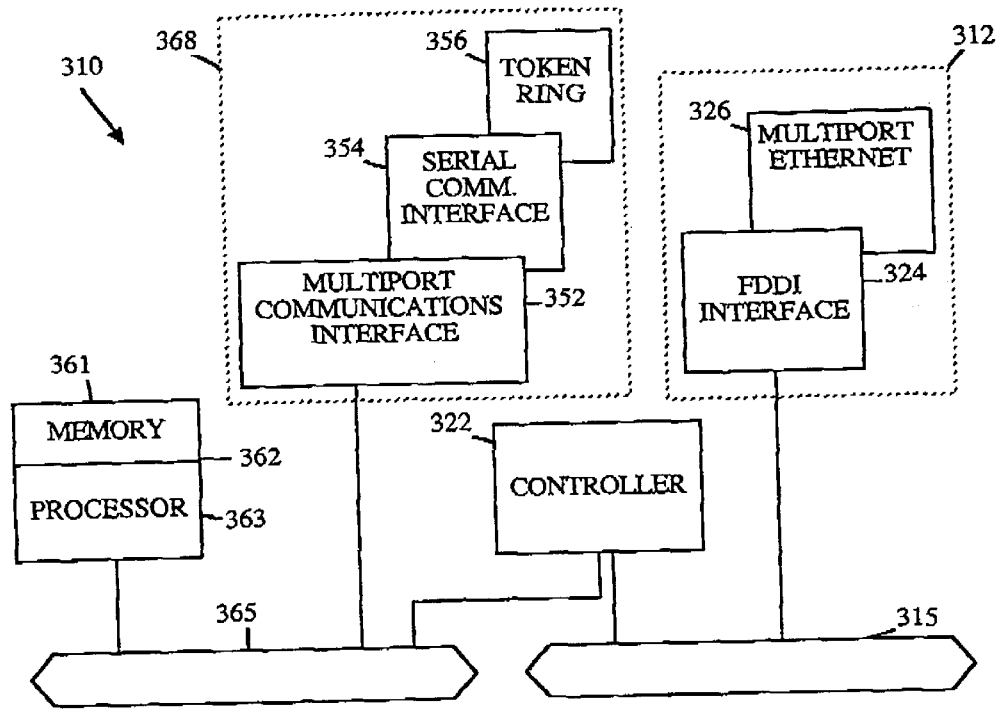
FIG. 3 is a block diagram of a router that may be used in this invention.

Referring now to FIG. 3, a router/agent 310 of the present invention includes a master central processing unit (CPU) 362, low and medium speed interfaces 368, and high speed interfaces 312. When acting under the control of appropriate software or firmware, the CPU 362 is responsible for such router tasks as routing table computations and network management. It is also responsible for registration, packet tunneling and other Mobile IP functions of a Home Agent or a Foreign Agent. It may include one or more microprocessor chips 363 selected from complex instruction set computer (CISC) chips (such as the Motorola MPC860 microprocessor or the Motorola 68030 microprocessor, reduced instruction set computer (RISC) chips, or other available chips. In a preferred embodiment, a memory 361 (such as non-volatile RAM and/or ROM) also forms part of CPU 362. However, there are many different ways in which memory could be coupled to the system.

The interfaces 312 and 368 are typically provided as interface cards. Generally, they control the sending and receipt of data packets over the network and sometimes support other peripherals used with the router 310. The low and medium speed interfaces 368 include a multiport communications interface 352, a serial communications interface 354, and a token ring interface 356. The high speed interfaces 312 include an FDDI interface 324 and a multi-port ethernet interface 326. Preferably, each of these interfaces (low/medium and high speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching and filtering, and media control and management. By providing separate processors for the communications intensive tasks, this architecture permits the master microprocessor 362 to efficiently perform routing computations, network diagnostics, security functions, etc.

The low and medium speed interfaces are coupled to the master CPU 362 through a data, control, and address bus 365. High speed interfaces 312 are connected to the bus 365 through a fast data, control, and address bus 315 which is in turn connected to a bus controller 322. The bus controller functions are provided by a processor such as a 2901 bit slice processor.

Although the system shown in FIG. 3 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router.

The standby protocol of this invention can be run on any of a number of transport protocols including TCP ("Transmission Control Protocol") and UDP ("User Datagram Protocol"). Preferably, UDP is used as the transport protocol of this invention. Thus, UDP is used by an active Home Agent to dump its mobility binding to a new standby Home Agent. The active Home Agent also uses UDP to keep the standby Home Agent apprised of new registrations.

2. Registration and Other High Level Functions in the Standby Protocol

Figure 4:
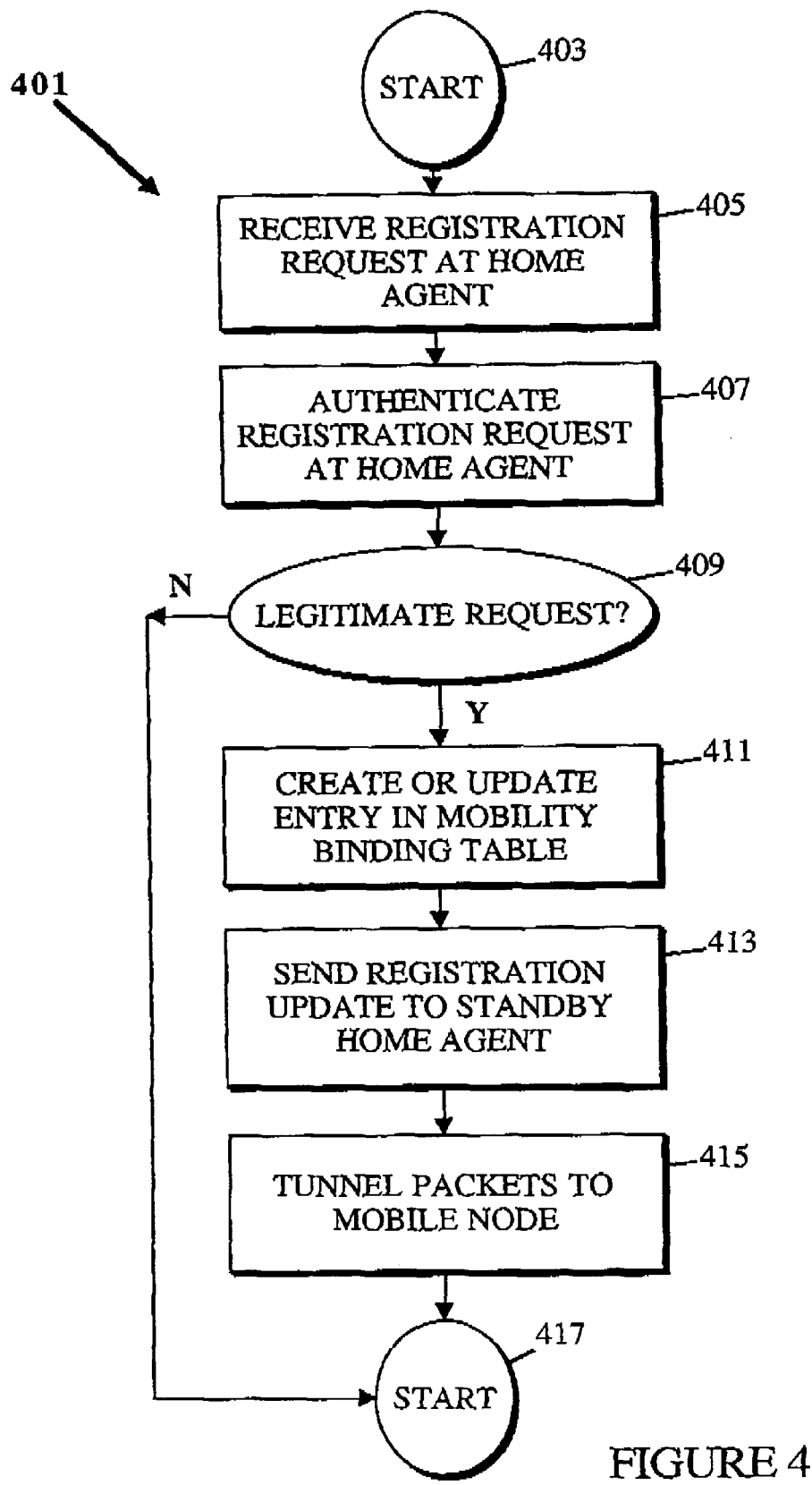
FIG. 4 is a process flow chart illustrating how new registrations of Mobile Nodes are handled by Home Agents in accordance with the redundancy protocol of this invention.

FIG. 4 is a process flow chart illustrating how new registrations of Mobile Nodes are handled by active Home Agents in accordance with the redundancy protocol of this invention. A registration process 401 begins at 403 and in a process step 405 the Home Agent receives a registration request from a Foreign Agent with whom the Mobile Node has attached. At this point, the Home Agent authenticates the registration request by checking the registration request against a key shared by it and the Mobile Node (see step 407). After the Home Agent authenticates the request at step 407, it determines whether the request is legitimate (whether the shared key matches) at a decision step 409. If not, the process is completed at 417. If so, the process continues at a step 411.

At this point, the Home Agent creates or updates the Mobile Node entry in its mobility binding table. If it already has the Mobile Node entry in its mobility binding table, it simply updates it to reflect the new registration (see step 411). If it does not yet have an entry for the Mobile Node, it creates such a new entry and adds it to the mobility binding table. In order to synchronize the mobility binding tables in the active and standby Home Agents, the Home Agent must now send the registration update to the standby Home Agent at a step 413. This is preferably accomplished by sending a UDP message to the standby Home Agent. The standby Home Agent should then update its own internal mobility binding table so that it is in fact synchronized with the active Home Agent. This means that if the active Home Agent should resign or fail, the standby Home Agent can come up and be ready to function by tunneling packets to preregistered Mobile Nodes.

After the active Home Agent has sent the appropriate registration update to the standby Home Agent, it may continue performing normal Home Agent functions such as tunneling packets addressed to the Mobile Node over to the Foreign Agent (see step 415). At this point, the relevant process flow is complete as indicated at 417.

To authenticate a request (e.g., step 407), the Mobile Node and the Home Agent share a key. When the Mobile Node/Foreign Agent is registering with the Home Agent, the Mobile Node hashes the registration information with the shared key to set a value. Then it sends the registration request with the value to Home Agent. When the Home Agent receives this information, it too hashes the registration information with the shared key. It compares the resulting value with the set value that it received from the Mobile Node. If the values match, the request has been authenticated.

In a preferred embodiment, the message used update the standby router of new registrations includes only some of the many available registration fields provided by Mobile IP. Generally, the registration update message should include at least the information required to populate the fields in the mobility binding table. In one example, the message includes the necessary headers (e.g., IP and UDP), a service field (as described below), a lifetime specifying the number of seconds remaining before the registration is considered expired, a home address specifying the IP address of the Mobile Node, a home agent specifying the IP address of the Mobile Node's Home Agent, a C.O. address specifying the IP address for the end of the tunnel, an Identification constructed by the active Home Agent used for matching a binding update with a binding update acknowledgment and for protecting against replay attacks of the binding update messages, and Extensions for authentication.

FIG. 5 presents a simple example of a mobility binding table of the type that may be used in the active and standby Home Agents of this invention. This table contains fields that are identical to some in the tables contemplated in the Mobile IP standard protocol. As shown in FIG. 5, a mobility binding table 521 includes at least six fields. Each registration should be represented by a separate record having values in each of these fields. This example, three separate registration records 523, 525, 527 are illustrated in table 521.

A first field 531 provides the Mobile Node home IP address for the Mobile Node when it is on its home base network segment. A second field 532 provides the Home Agent address for each of the registrations. In some cases, a given router having the mobility binding table may serve as Home Agent for two or more groups of Mobile Nodes. For each such group the router will have a different IP address. To distinguish between these potentially different service groups, field 532 is provided. A third field 533 is the care of address (or C.O. address) which specifies the address of the Foreign Agent to which the Mobile Node is currently attached. As explained above, this is the address to which packets are tunneled from the Home Agent to the Mobile Node. A fourth field 535 known the Identification Field specifies an ID number which serves as both a sequence number for the registration and a replay protection marker. A fifth field 537 specifies the granted lifetime which is fixed during registration. As indicated above, initially during the registration process, the Home Agent and Foreign Agent negotiate for the registration and its terms. One of the terms is the lifetime of the registration. That value is specified in field 537. A sixth field 539 specifies the remaining time of registration. Finally, a service field 541 specifies registration flags in the bit order SBDMGVxx, where S is simultaneous bindings, B is broadcast, D is decapsulated by Mobile Node, M is minimum IP encapsulation, G is GRE encapsulation, and V is Van Jacobson hdr compression.

A router maintains the mobility bindings while it acts as the active or standby Home Agent (i.e., as long as it remains in the active or standby state). However, when the router no longer assumes either role, it removes the mobility bindings.

The information provided in the mobility binding table specifies functioning of the nodes according to a defined protocol (Mobile IP in this case). The Hot Standby Router Protocol operates based upon topological considerations only. It has no facilities for handling protocol specific functions such as controlling and updating the mobility binding table.

The invention is not merely limited to redundancy for Mobile IP. Many other high level network protocols could benefit from a redundancy protocol. Examples include network address translation, (NAT, RFC 1631), Dynamic Host Configuration Protocol (DHCP, RFC 1541 and RFC 2131) servers, Reflexive Access List (http:/www.cisco.com/univercd/cc/td/doc/products/software/ios113ed/113ed_cr/secur_c/scprt3/screflex.htm), Lock and Key (http://www.cisco.com/warp/public/732/Security/landk_wp.htm), Context-Based Access List (http://www.cisco.com/warp/public/732/net_foundation/firewall_feature.html), IP Security (IPSec, RFC 1825, RFC 1826, RFC 1827), H.323 gatekeeper, and GPRS support nodes: SGSN & GGSN (see GSM 03.60—Digital cellular telecommunications systems (Phase 2+); General Packet Radio Service (GPRS); Service Description; Stage 2 and GSM 09.60—Digital cellular telecommunications system (Phase 2+); General Packet Radio Service (GPRS); GPRS Tunneling Protocol (GTP) across the Gn and Gp interface)). These protocols are known in the art and described at various locations including the above references. In any of these examples, a router must keep a dynamic table or list that changes as packets are sent, connections are formed, etc. For example, address translation tables are maintained in Network Address Translation (NAT), address bindings are maintained in Dynamic Host Configuration Protocol (DHCP) servers, dynamic ACL are maintained in Reflexive Access List, and TCP and GTP layer context are maintained in GPRS support nodes: SGSN & GGSN.

In preferred embodiments, the standby group includes only a single standby Home Agent. This reduces the overhead required to synchronize a sizable group of standby Home Agents. Synchronization of such a group would typically require multicast addressing. In the preferred embodiment of this invention, registration changes can simply be unicast to a single Home Agent. Further, succession of the active Home Agent is simplified because there is not question about which standby Home Agent will take over. Nevertheless, the invention could also be applied in the case where there are multiple standby Home Agents, who are kept up to date on registration changes by multicast messages, for example.

If the standby protocol of this invention is employed in the context of a Foreign Agent, then the dynamic visitor table must be synchronized between an active and a standby Foreign Agent. A typical visitor table in Mobile IP includes at least the following fields: a Mobile Node home IP address, a source address of registration request, a C.O. address, a Home Agent address, the requested lifetime, the remaining lifetime, registration service flags, an identification field, the SPI used in registration, the UDP source port, and the Mobile Node's MAC address. In a preferred embodiment, each of these are synchronized between the active and standby Foreign Agents by messages containing the information in these fields.

3. A Router/Home Agent Enters or Leaves the Network Group

In a preferred embodiment, Mobility Agents enter and leave the network according to a procedure which efficiently determines whether an active Mobility Agent must be replaced, and if so, determines how the standby Mobility Agent (now the active Mobility Agent) is to be replaced. A Mobility Agent may leave a network segment in one of two ways: (1) it can simply go down without first notifying the other routers, or (2) it can officially resign by broadcasting its departure. Examples of the first case include a Mobility Agent abruptly losing power, crashing, system reloading, etc. Examples of the second case include scheduled maintenance, etc. Generally, the broadcast resignation is preferable because it allows other routers/Mobility Agents in the network to take immediate steps and thereby smooth the transition. A Mobility Agent which leaves the group can subsequently reenter, but can not immediately assume the role of active or standby Mobility Agent (unless there are no other functioning standby Mobility Agents). The reentering Mobility Agent will have to await appropriate circumstances before assuming such a role.

To negotiate with one another for the statuses of active and standby Mobility Agents, the Mobility Agents of the this invention can send three types of relevant messages: hello messages, coup messages, and resign messages. Hello messages notify other routers/Mobility Agents in the network that a particular router is operational in the system. The format of such hello message is generally similar to that of the hello messages used in protocols such as OSPF. Coup messages from local routers tell standby (or active) Mobility Agent that a local router wishes to take over as the standby (or active) Mobility Agents. Resign messages tell the other routers that an active Mobility Agent wishes to leave its post.

Depending upon a particular router's state and the information contained in each of these messages, the particular router may or may not change its state. Most generally, the routers/Mobility Agents of this invention can assume one of three states: passive (sometimes referred to as "new"), standby, and active. As will be explained below, a new router actually resides in one of four substrates. Active Mobility Agents have adopted their group's virtual IP and MAC addresses and therefore take responsibility for registration, tunneling, and synchronizing the standby Mobility Agent's mobility binding table with its own. The standby Mobility Agent is available to immediately take over as active Mobility Agent if the current active Mobility Agent should fail or resign. Both active and standby Mobility Agents issue periodic hello messages to let the other routers/Mobility Agents on the network know their statuses. Both also tunnel packets to remote Mobile Nodes. New routers may listen for these hello messages and may under some circumstances issue their own hello messages or attempt a coup of the standby or active Mobility Agent.

If an active or standby Mobility Agent fails or otherwise leaves a standby group, it will simply stop sending hello messages. At the end of a defined length of time during which no hello messages are received from the active Mobility Agent, the standby Mobility Agent will take over. The remaining routers in the segment will then conduct an election to install a new standby Mobility Agent in place of the one that took over as active Mobility Agent. If neither the active Mobility Agent nor the standby Mobility Agent is functioning, the remaining routers will conduct an election to fill both the active and standby slots. In that case, the new router/Mobility Agent with the highest priority assumes the role of active Mobility Agent and the new router/Mobility Agent with the second highest priority assumes the role of standby Mobility Agent.

When a standby Mobility Agent receives an active Mobility Agent's resign message (when, for example, it is being taken down for scheduled maintenance), the standby Mobility Agent automatically assumes the role of active Mobility Agent. At the same time, the new routers/Mobility Agents (having also received the resign message) anticipate that there will not be a standby Mobility Agent and conduct their own election. As a result of the election, a new standby Mobility Agent is installed from among the group of new routers/Mobility Agents.

As suggested, each router/Mobility Agent has a specified priority which is used in elections and preemption of the standby or active Mobility Agent. A priority is configured for each router/Mobility Agent by a user of the sub-network. The priority of each router/Mobility Agent is preferably an integer between 0 and 255 (i.e., an 8 bit word) with 100 being the default. Generally, the router having the highest priority should be the active Mobility Agent and the router having the second highest priority should be the standby Mobility Agent. When routers enter or leave the standby group, the priority-based elections and preemptions of this invention smooth the transition so that the group routers/Mobility Agents can quickly and with minimal disruption assume their correct status in the system. In the event that two routers/Mobility Agents having the same priority are seeking the same status, the primary IP addresses of these routers are compared and the router having the higher IP address is given priority. Within the scope of this invention, various other methods can be used to conduct elections to determine active and standby Mobility Agents. For example, a router's current and recent parameters may be used to adjust its priority.

Figure 6:
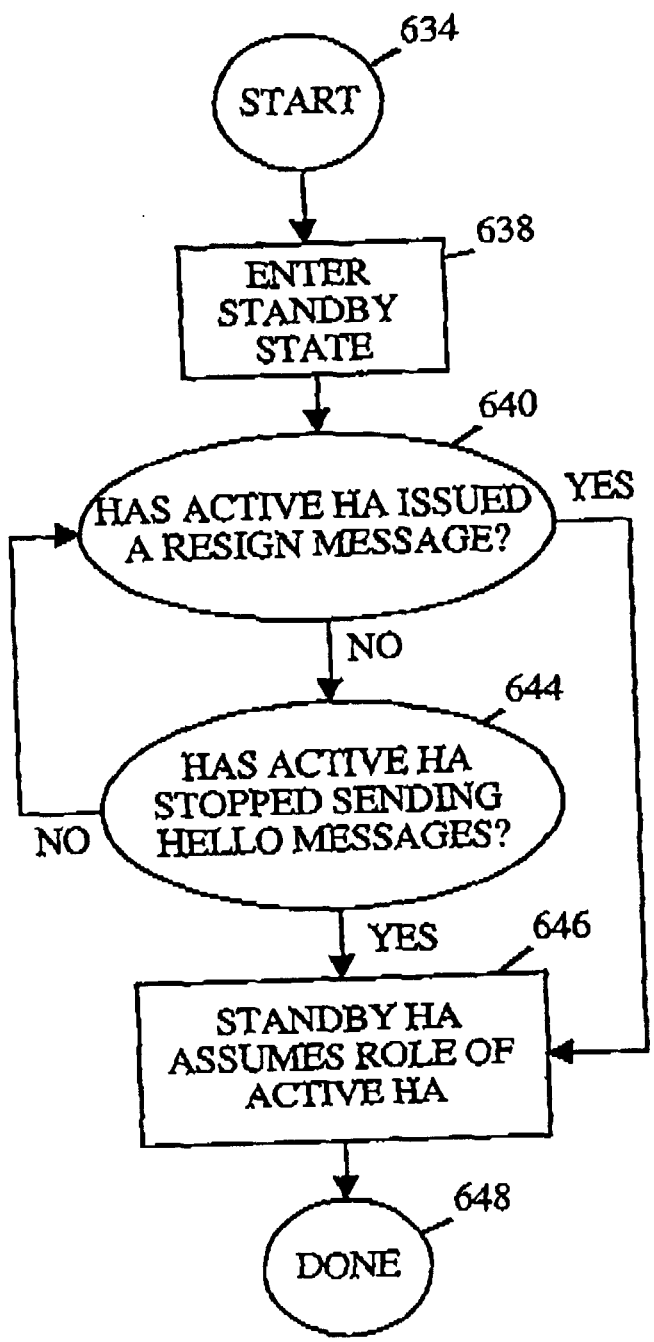
FIG. 6 is a process flow diagram showing generally the steps involved in replacing a departing active router (which emulates the group virtual router) with a standby router.
Figure 7A:
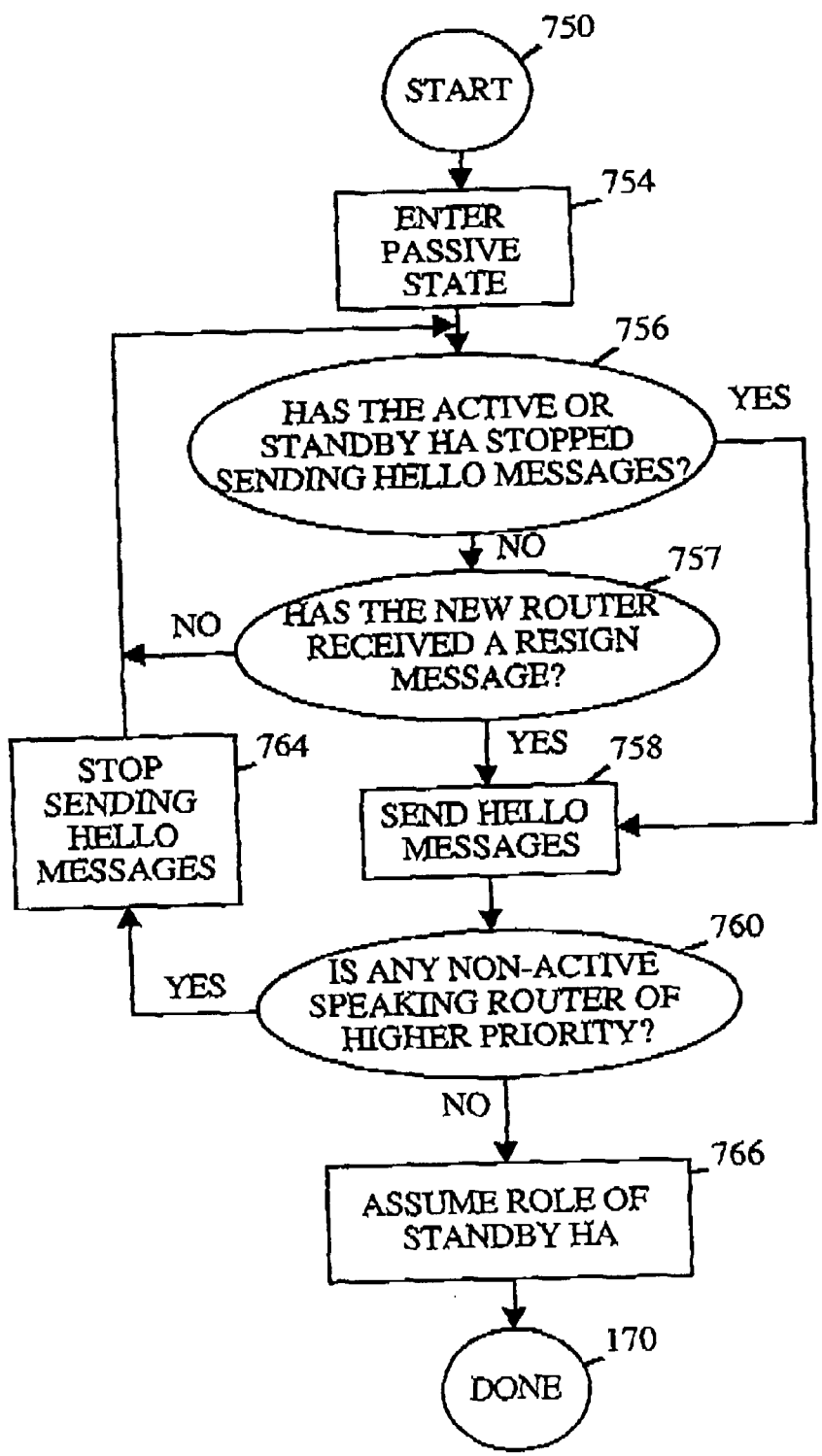
FIG. 7A is a process flow diagram showing the steps involved in replacing a departing standby router with a new router from a group of routers.
Figure 7B:
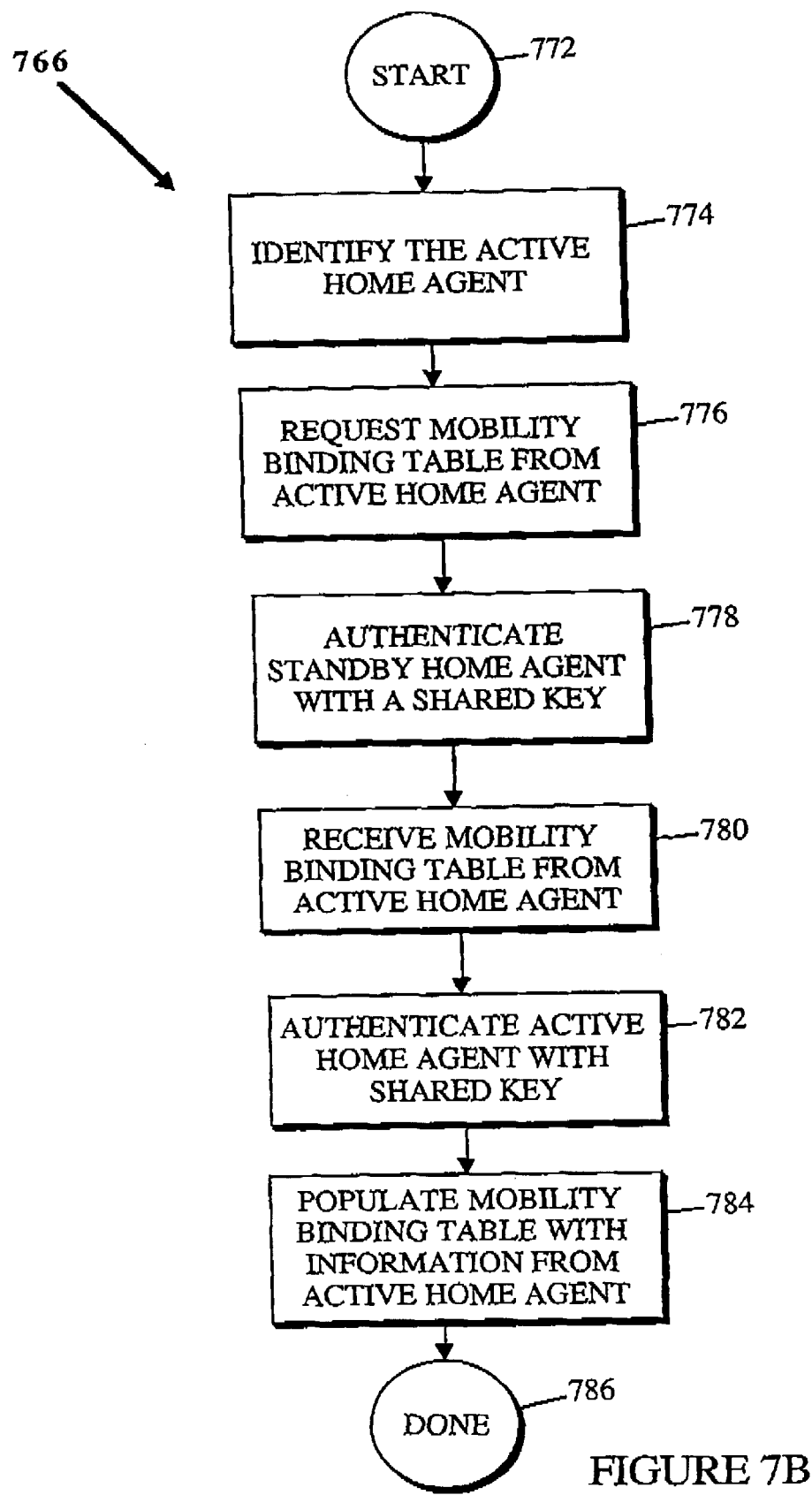
FIG. 7B is a process flow chart detailing how a router assumes the status of standby Home Agent (after it has been elected to that post).

Some important events in this invention are detailed in the flow charts of FIGS. 6, 7A and 7B. The first of these involves a standby Mobility Agent (exemplified as a Home Agent in the figures) taking over for an active Mobility Agent which has left its standby group for some reason. The second of these involves a new router taking over for a standby Mobility Agent which has assumed the role of active Mobility Agent. It should be understood that these flow diagrams as well as the others presented herein are provided as convenient representations to aid in understanding the state transitions of router/Mobility Agent used in this invention. Some of the flow diagrams are organized in a manner that could imply that the system checks for certain actions by event loops or polling. No such limitation is intended. Thus, the process flow charts presented herein should not be read to imply that the system necessarily checks for events in the order listed.

FIG. 6 presents a process flow diagram showing the conditions under which a standby Mobility Agent takes over when an active Mobility Agent leaves its standby group. It should be understood that a standby Mobility Agent can become active under other circumstances (i.e., receipt of a lower priority hello from the current active Mobility Agent when the standby Mobility Agent is configured to preempt). For purposes of FIG. 6, however, it is assumed that the active Mobility Agent has left without provocation from another router/Mobility Agent. The other cases will be addressed elsewhere. The process of FIG. 6 begins at 634 and at a step 638, the router under consideration enters the standby state. Next, the standby Mobility Agent determines whether the current active router has issued a resign message at a decision step 640. If not, the standby Mobility Agent determines whether the active Mobility Agent has stopped sending hello messages at a step 644. As long as decision steps 640 and 644 are answered in the negative, the standby Mobility Agent continues to await an event in which one of these decisions can be answered in the affirmative. When that happens, the standby Mobility Agent assumes the role of active Mobility Agent in a step 646. Thereafter, the process is concluded at 648. Note that the standby Mobility Agent may also be configured to preempt the active Mobility Agent. The preempt capability will be described in more detail below.

FIG. 7A shows how a router/Home Agent in the new state (passive state) can take over for a standby Home Agent which has left its post in the standby group. The standby Home Agent could be asked to relinquish its post by another router, but that situation will not be addressed here. The process begins at 750 and in a step 754, the router under consideration enter the new state. Next, in a decision step 756, that router determines whether the active or standby Home Agents have stopped sending hello messages. If not, the router determines whether it has received a resign message in a decision step 757. The router/Home Agent continues asking the questions posed in steps 756 and 757 until one is answered in the affirmative. At that point, the router begins sending its own hello messages at a step 758. Thereafter in a decision step 760, the new router determines whether any non-active router which is currently speaking has a higher priority than its own. If not, the new router assumes the role of standby Home Agent at a step 766 and the process is concluded at 770. If, on the other hand, decision step 760 is answered in the negative, the new router stops sending hello messages at step 764 and the process control returns to decision step 756.

FIG. 7B is a process flow chart detailing how a router assumes the status of standby Home Agent (after it has been elected to that post). This flow chart corresponds to step 766 of FIG. 7A. The process begins at 772 and proceeds to a step 774 where the new standby Home Agent identifies the currently Active Home Agent. This may involve nothing more than listening for the hello message of the Active Home Agent. When the active Home Agent has been identified, the new standby Home Agent requests, at a step 776, that it provide its mobility binding table (see FIG. 5 for an example). Before the active Home Agent can service the request, it must authenticate the new standby Home Agent (see step 778). It does this with a shared key in a manner similar to that in which the active Home Agent verifies that it is negotiating for registration on behalf of a valid Mobile Node (discussed above).

After the active Home Agent authenticates the new Standby Home Agent, it replies by sending its internal mobility binding table to the Standby Home Agent as requested (see step 780). Now, the standby Home Agent authenticates the active Home Agent at a step 782. It accomplishes this with a shared key in the manner described above. Assuming that the active Home Agent is authenticated, the standby Home Agent populates its internal mobility binding table with the information provided by the active Home Agent (see step 784). The process flow of interest finishes at a step 786.

The process of FIG. 7B could be applied to a Foreign Agent standby group. In that case, the mobility binding table would be replaced with a visitor table.

The above discussion of FIGS. 7A and 7B assumes that only the standby Mobility Agent will need to be replaced. Normally, when an active Mobility Agent stops sending hello messages, the standby Mobility Agent will take over after the hold time expires. It then begin sending its own hello messages (as active Mobility Agent) before the next hold time for the active Mobility Agent expires. Thus, the new routers/Mobility Agents recognize that they are not to take over for the previous active Mobility Agent. However, if both the active and standby Mobility Agents have left their posts, then the new router with the highest priority will actually take over the role of active Mobility Agent. The process is essentially identical to that outlined in FIG. 7A, except that the new router assumes the role of active Mobility Agent after first assuming the role of standby Mobility Agent at step 766.

The abrupt departure of an active or standby Mobility Agent from the network group without first issuing a resign message is noted by the other routers/Mobility Agents in the system by the absence of a hello message. Normally, the active and standby Mobility Agents send periodic hello messages—once every predefined "hellotime." However, as indicated in FIG. 7A, new routers which have not discovered an active Mobility Agent within "holdtime" may also send hello messages. That is, when a new router does not hear a hello message from a standby and/or active Mobility Agent within a predefined period known as a "holdtime," the new router begins sending its own hello messages. In one specific embodiment, the default hellotime is between about 1 and 3 seconds and the default holdtime is between about 3 and 10 seconds. Typically, the hold time is at least three times the hello time. All routers/Mobility Agents in the same group use the same hellotime which may be specifically configured by a user. In a preferred embodiment, all hello messages are sent using the all-routers IP multicast address 224.0.0.2. The source address of the hello message is the router's primary IP address, and not the group's active IP addresses.

In addition to source address, the hello message contains the following items:
The active IP address
The hello time
The hold time
The router's priority
The router's status (active, standby, new)
Authentication
A version number
A group number The authentication is the same for each router in the group and is provided as a password (shared key) to ensure that the routers in the system get their information regarding hellotime, holdtime, dynamic IP address, etc. from a packet issued by a Mobility Agent within their group. The version number represents the implementation of the standby protocol. The group number represents the standby group which issued the hello message.

As explained, when non-active routers/Mobility Agents on the network do not hear a hello from the active router within a holdtime, they may take steps to change their status. In the case of the current standby Mobility Agent, if it sees the hold time expire on the active Mobility Agent, it immediately becomes the active Mobility Agent. In the case of the new router/Mobility Agent, if it sees the hold time expire on the standby Mobility Agent, it then sends a hello message (i.e., it enters "speak" state). If within another hold time, no other routers other than the active Mobility Agent send a hello message of higher priority, then the new router assumes the status of standby Mobility Agent. If, on the other hand, while sending hello messages, a given new router receives a hello message of higher priority from another new router, then the given new router stops sending hello messages and becomes ineligible to take over as the standby Mobility Agent (at least temporarily).

An active Mobility Agent which decides to leave the network should first send a resign message so that the standby Mobility Agent can take over smoothly. Only the active Mobility Agent is permitted to send a resign message. In response to a resign message, the standby Mobility Agent automatically becomes the active Mobility Agent. In response to the same resign message, the new routers/Mobility Agents begin sending hellos as part of an election to see which one of them takes over as standby Mobility Agent. If a given router hears no hello messages of higher priority than his own within a hold time, that router takes over as the standby Mobility Agent. The resign message includes all information found in the hello messages, but only the status and authentication fields are particularly pertinent.

Routers may enter a standby group for various reasons such as having previously lost power or otherwise failed. As explained, there are two scenarios under which the reentering router may assume the role of standby or active Mobility Agent within the standby group. Which of these scenarios is employed depends upon whether the incoming router is configured to "preempt" a standby or active Mobility Agent. If it is, the entering router sends a coup message to the current standby Mobility Agent (ignoring the active Mobility Agent preemption for the time being) when it believes it has priority over that Mobility Agent. After the coup message is received by the current standby Mobility Agent, the priorities of the entering and standby Mobility Agents are compared. If the entering router has a higher priority, the current standby Mobility Agent resigns and the incoming router takes over.

If an entering router is not configured to preempt the active Mobility Agent, it can send no coup messages to the active Mobility Agent. However, it can become a active Mobility Agent indirectly. For example, it can first become a standby Mobility Agent by taking over for a failed standby Mobility Agent as described above. After the incoming router assumes standby status, it automatically takes over for the current active Mobility Agent when that Mobility Agent fails or resigns.

Figure 8:
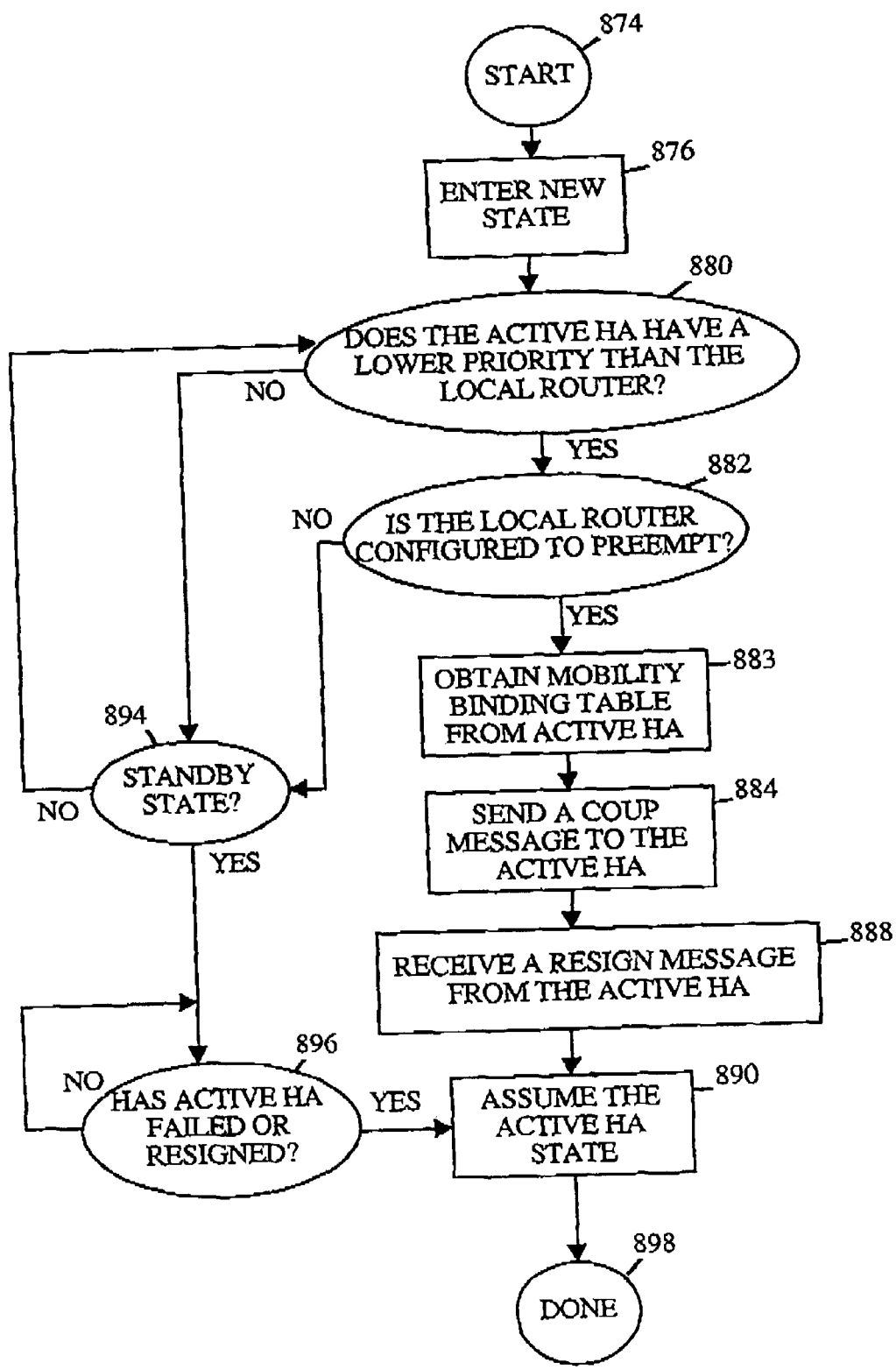
FIG. 8 is a process flow diagram presenting the processes by which a new router entering a network segment can preempt an active Home Agent in accordance with an alternative this invention.

Some options available to a new router entering a standby group are detailed in FIG. 8. This process presents the possibility of a new router configured to preempt an active Mobility Agent (Home Agent in the Figure). However, the process could apply equally to preemption of a standby Mobility Agent. The process begins at 874 and proceeds to a step 876 where the entering router/Home Agent assumes the "new" state. Thereafter, in a decision step 880, the new router determines whether the active Home Agent in its standby group has a lower priority than itself (preferably by analyzing hello messages from the active router). If so, the new router then determines at a decision step 882 whether it is configured to preempt. In a preferred embodiment, it is not configured to preempt. If, however, it is configured to preempt, it obtains a copy of the current active Home Agent's mobility binding table at a step 883. Thereafter, it sends a coup message to the active Home Agent at a step 884. It then receives a resign message from the active Home Agent at step 888. Finally, it assumes the status of active Home Agent at step 890 and the process is completed at 898.

The protocol of this invention provides for the event in which a coup or resign message is lost or not received by the new router. If a coup message is lost, there will simultaneously be two active Home Agents. In such situations, the lower priority active Home Agent (i.e., the original active Home Agent) will receive a hello message from the other active Home Agent within the next hello time after the new router assumes active status. Upon receiving such hello message, the original active Home Agent will immediately relinquish its active status and revert to new router/Home Agent status. If a resign message from an active Home Agent is lost, the other routers in the group will quickly determine that the active Home Agent is no longer present by the absence of a hello message from the active Home Agent. As explained, if no hello message is received from an active Home Agent within a hold time, the other routers in the group take steps to fill the role of active Home Agent and, if necessary, standby Home Agent.

The protocol of this invention also guards against loss of a previous registration during a preemption of an active Home Agent. This protection is provided at step 883 which requires that the "preempting" router first obtain the up to date mobility binding table of the active Home Agent which it is seeking to overtake. Beyond this, it may be desirable to get clearance from Mobile IP before a preemption is undertaken. For example, if a new registration is being negotiated, Mobile IP may bar preemption until after the registration is complete. In operation, the preempting router may make its intention known to Mobile IP. Mobile IP may deny the preemption temporarily. At that point, the standby protocol would set a timer and wait until for a defined period of time to elapse before renewing its preemption request.

Returning again to FIG. 8, if either of decision steps 880 or 882 is answered in the negative, the new router determines whether it can enter the standby state at a decision step 894. It can enter the standby state by waiting for the current standby Home Agent to leave the group or assume active Home Agent status as detailed in FIG. 7A. Alternatively, the new router can listen for hello messages from the standby Home Agent and then compare priorities. If the standby Home Agent has a lower priority, the new router sends its own hello message to let the standby Home Agent know that it should relinquish its role. Assuming that the new router can not yet enter the standby state (i.e., decision step 894 is answered in the negative), the new router simply waits until an active Home Agent with a lower priority takes over or the new router itself can assume the standby state. That is, either decision step 880 or decision step 894 is answered in the affirmative. Assuming that decision step 894 is answered in the affirmative, the new router determines whether the currently active Home Agent has failed or resigned at decision step 896. This is detailed in FIG. 6. When such event occurs, the router assumes the role of active Home Agent at step 890 (i.e., decision step 896 has been answered in the affirmative).

The procedure for determining the active Home Agent's priority (step 880) involves first listening for a hello message issued by the active Home Agent. When such a hello message is received, the new (listening) router checks the priority in that message against its own priority. If the new router determines that it has a higher priority than the active Home Agent and it is configured to preempt, the new router immediately broadcasts a coup message to the active Home Agent. The coup message includes the same fields as contained in the hello message, but only the priority, status, and authentication fields are particularly pertinent.

From the active Home Agent's standpoint, when it receives an acceptable coup message (i.e., one from a router having a higher priority than it own) it resigns from the status of active Home Agent. This involves removing the group MAC address from its address filter and then unicasting a resign message to the sender of the coup message. The active Home Agent then returns to the new state. If the resign message would be broadcast rather than be unicast, the standby Home Agent—as well as the router sending the coup message—would transition to active state.

4. The Router as a State Machine

Figure 9:
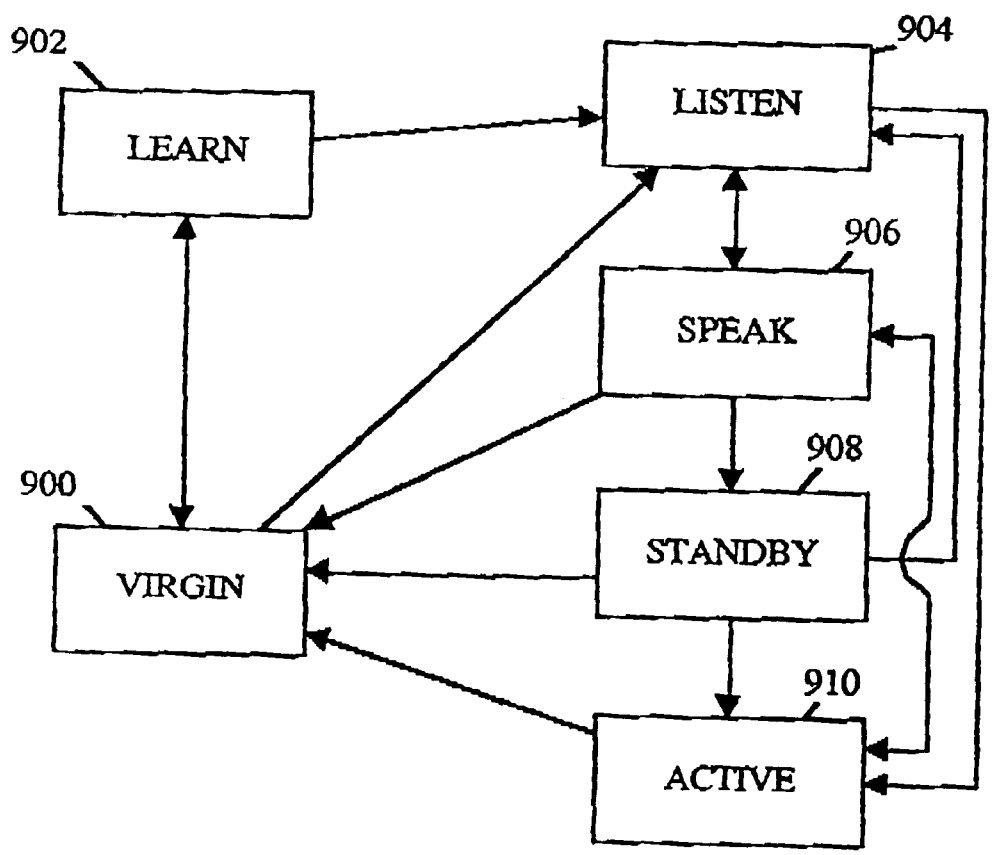
FIG. 9 is a state diagram of a router/Home Agent in a preferred embodiment of this invention.

FIG. 9 is a state diagram showing the acceptable state transitions of a router/Mobility Agent of this invention. As discussed above, the routers/Mobility Agents of this invention generally include three states: new, standby, and active. However, the new state can be further divided into four substrates: virgin 900, learn 902, listen 904, and speak 906. Typically, the virgin state 900 is entered when the router/Mobility Agent undergoes a configuration change or when the interface of the standby group first comes up. Further, if the protocol of this invention is disabled on a network segment, all routers/Mobility Agents on that segment enter the virgin state. A router in the learn state 902 listens to hello messages from the current active Mobility Agent in order to learn "minimal information" (i.e., the hello and hold timers and virtual IP address). This minimal information is relearned any time it is heard regardless of the router's current state. It should be noted, however, that the information is learned only if the authentication in the packet containing the information matches that of the current router. Once a router in the learn state 902 has learned the minimal information, it transitions to the listen state 904 were it continues to listen to hello messages from both the active and standby Mobility Agents. A router/Mobility Agent in the speak state 906 sends a hello message once every hello time. Routers in the learn and listen states send no hello messages. As noted above, Mobility Agent routers in the active state 910 and standby state 908 also send and listen for hello messages.

The state chart shown in FIG. 10 will now be described with reference to eleven different events of significance to the routers/Mobility Agents of this invention. These events are the following:

1—Hot standby protocol configured on an interface.

2—Hot standby protocol disabled on an interface.

3—ActiveTimer expiry.

4—Receive Hello of higher priority router in Speak state.

5—Receive Hello of higher priority Active Mobility Agent.

6—Receive Hello of lower priority from Active Mobility Agent.

7—Receive a Resign message from Active Mobility Agent.

8—Receive a Coup message.

9—StandbyTimer expiry.

10—Receive Hello of higher priority Standby Mobility Agent.

11—Receive Hello of lower priority from Standby Mobility Agent.

The first event is configuring the protocol of this invention on a network segment. The virgin state is the only router state existing at this point. As shown in FIG. 10, the virgin routers/Mobility Agents start their "active" and "standby" timers. The active timer sets the hold time associated with the active Mobility Agent. If the active timer expires without a hello message being received from the active Mobility Agent, the group may assume that their active Mobility Agent is inoperative. The standby timer performs a similar function for the standby Mobility Agent. After active and standby timers have been started, a router transitions to either the learn or listen state depending upon whether minimal information (this is the timer information and IP address) has been discovered. If the minimal information has been discovered, the system transitions to the listen state. Otherwise, it transitions to the learn state.

Disabling the protocol of this invention on a network segment is the second event of note shown in FIG. 10. This causes routers/Mobility Agents in every state to first clear their active and standby timers and then reenter the virgin state. The active Mobility Agent, in addition, sends a resign message before entering the virgin state.

The third event of note is expiration of the active timer. This indicates that a router/Mobility Agent has not received a hello message from the active router within the hold time. This has no effect on routers in virgin, learn, and speak states. However, routers/Mobility Agents in the standby state immediately clear their active timers and assume the status of active Mobility Agent, thus serving their function as backup. In addition, routers in the listen state restart their active and standby timers and transition to the speak state upon expiration of the active timer. This permits those routers to be considered for the role of standby Mobility Agent, which has now been vacated.

The fourth event of note is receipt of a hello message from a router/Mobility Agent in the speak state having a higher priority than the router/Mobility Agent receiving the hello message. This effects only those routers in the speak and standby states. Any router in the speak state receiving such a message, discontinues sending hello messages and reverts to the listen state. Thus, only the router speaking with highest priority remains in the speak state and is thereby eligible for promotion. If a standby Mobility Agent receives a hello message from a speaking router having a priority higher than its own, it starts its standby timer and reverts to the listen state. This would occur when a new router arrives after there are already active and standby Mobility Agent, and the new router has a higher priority than the current standby Mobility Agent.

Hello messages from the active Mobility Agent can be expected to contain a priority that is higher than that of the receiving router/Mobility Agent. When this occurs (the fifth event of note in FIG. 10), routers/Mobility Agents in the virgin, learn, listen, speak, and standby states learn the minimal information (denoted as "snoop" in FIG. 10). In addition, these routers restart their active timers. Routers in the learn state further start the standby timer and transition to listen state. If a Mobility Agent currently in the active state receives a hello message from another active Mobility Agent which has a higher priority, the active Mobility Agent receiving this message immediately restarts its active and standby timers and transitions to the speak state.

In some instances, most notably when a high priority router reenters the standby group, a router may receive a hello message from an active Mobility Agent having a priority lower than its own (the sixth event of note). In this case, routers in the learn, listen, speak, and standby states learn the minimal information and restart their active timers. Routers in the learn state also, start their standby timer and transition to the listen state. Routers/Mobility Agents in the listen, speak, and standby states have the option of issuing a coup message. More specifically, if these routers/Mobility Agents are configured to preempt the active Mobility Agent, they will issue a coup message. Otherwise, they will remain in their current state. If a coup message is sent, routers/Mobility Agents in the listen, speak, or standby state then clear their active timer and transition to the active state. Routers in the listen and speak states also restart their standby timers. If a router/Mobility Agent currently in the active state receives a hello message from a different active Mobility Agent having a lower priority, the active Mobility Agent receiving the message then issues a coup message.

In response to a coup message, an active Mobility Agent may issue a resign message (the seventh event of note in FIG. 10). Alternatively, if the active Mobility Agent decides on its own to relinquish it role as active Mobility Agent, it will also issue a resign message. Regardless, of the circumstances under which the resign message is issued, a router/Mobility Agent in the listen state receiving such message starts its active and standby timers and transitions to the speak state. A router in the speak state starts its active timer. Finally, a Mobility Agent in the standby state clears its active timer and transitions to the active state.

As noted, a coup message may only be received by the active Mobility Agent. When it receives such a message (the eighth noteworthy event), it sends a resign message, restarts its active and standby timers, and transitions to the speak state.

The ninth event of interest is expiration of the standby timer. When this occurs, routers/Mobility Agents in the listen state restart their standby timers and then enter the speak state. Of those routers that enter the speak state, the one having the highest priority will automatically transition to the standby state. If the standby timer expires while a router is in the speak state, that router then clears its standby timer and assumes the status of standby Mobility Agent.

When a router receives a hello message from a standby Mobility Agent (the tenth noteworthy event), the priority is checked. If that priority is higher than the priority of a receiving router/Mobility Agent in the listen, speak, standby, or active states, the router restarts its standby timer. If the receiving router is currently in the speak state, it then transitions to the listen state. If the router/Mobility Agent is currently in the standby state, it also, transitions to the listen state. Otherwise, there would be two routers/Mobility Agents in the standby state.

Finally, a router may receive a hello message from a standby Mobility Agent of a lower priority. A router in a listen state receiving such a message restarts its standby timer and transitions to the speak state. A router/Mobility Agent in the speak state receiving such a message clears its standby timer and transitions to the standby state. The previous standby Mobility Agent would have already relinquished its role in response to a hello message from the router in the speak state.

In some embodiments, Mobile IP must be kept informed of at least some state changes. For example, if a passive router becomes the standby Mobility Agent, the active Mobility Agent must be notified of this change so that it knows where to send new registration entries. It may also be desirable, in some embodiments, to permit clients find out the standby group's state information such as the active Mobility Agent's local IP address, the standby Mobility Agent's Ip address, etc.

5. Emulation of a Virtual Router

As indicated above, a "virtual address" is an address shared by a group of real network entities and corresponding to a virtual entity. In the context of this invention, one Home or Foreign agent from among a standby group of Home or Foreign agents emulates a virtual Home or Foreign Agent by adopting one or more virtual addresses, and another entity (such as a mobile node) is configured to send data packets to such virtual address(es), regardless of which agent is currently emulating the virtual agent. In preferred embodiments, the virtual addresses encompasses both MAC layer and network layer (e.g., IP) addresses. Usually various members of the group each have the capability of adopting the virtual address (although not at the same time) to emulate a virtual entity.

The standby group may also be given a group name. Thus, clients may find out which router is the active Mobility Agent, which is standby, etc. by using the group name, rather than the virtual IP address. Thus, the standby group may have a mapping of the group name to its virtual IP address. An API may be provided to call a routine with the group virtual address based upon the group name.

The user setting up the routers in the group can provide the group name and IP address by routine programming. Thus, the physical router elements involved in designating a virtual IP address include the main CPU and main memory.

An "IP (internet protocol) address" is a network layer address for a device operating in the IP suite of protocols. The IP address is typically a 32 bit field, at least a portion of which contains information corresponding to its particular network segment.

MAC addresses are typically provided in an address filter or "list" of MAC addresses in a router's interface controller. The procedure involved in inserting or removing a MAC address from the address filter depends upon the particular router being configured, but generally involves only routine programming. Preferably, the routers of this invention are able to add virtual MAC addresses to their controllers' MAC address filter while maintaining their primary MAC addresses. In some cases, a router will actually be capable of having multiple virtual MAC addresses while maintaining its primary MAC address. A technique for handling routers which are unable to handle more than one MAC address in their address filters is presented below.

A "MAC address" is an address of a device at the media access control sublayer of the data link layer, defined by the IEEE 802 committee that deals with issues specific to a particular type of LAN. The types of LAN for which MAC addresses are available include token ring, FDDI, and ethernet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network.

In a token ring arrangement, the virtual MAC address can be obtained from 1 of 32 well-known "functional addresses" used by protocols over token ring. It is important to choose a functional address that is not going to be used in the system in which the standby protocol is running. One such suitable MAC address for token ring arrangements has been found to be C000.0001.0000.

In broadcast-based LANs with location insensitive link layer addresses (e.g., ethernet and FDDI LANs), the virtual MAC address can be purchased from the IEEE. Suitable MAC addresses may be 1 of 256 addresses selected from the range 000.0c07.ac00 through 0000.0c07.acff. The last octet of this MAC address equals the standby protocol group number.

Unfortunately, some router controllers support address filtering for only one unicast MAC address. Such routers can still be used in the standby protocol of this invention, but the protocol must change the interface's primary MAC address when assuming or relinquishing control as the active Home Agent. This is potentially problematic because some traffic may otherwise wish to use the router's primary MAC address. However, the problem can be mitigated by having the router send out gratuitous ARP ("address resolution protocol") packets so that other network entities using IP update their ARP tables to reflect that the router is now using a group virtual MAC address rather than its primary MAC address.

While running the standby protocol, it is important to prevent a Mobile Node or other host from discovering the primary MAC addresses of the routers/Home Agents in its standby group. Thus, any protocol which informs a host of a Home Agent's primary address should be disabled. In IP, one such protocol involves sending ICMP redirect packets. These are intended to tell a host of the existence of alternative routes and in so doing require the host to discover a router's primary address. For example, if the active Home Agent receives a packet from a corresponding node or Foreign Agent and decides that the optimal route is through the standby Home Agent, the active Home Agent could, under normal circumstances, send redirect instructions (an ICMP redirect packet) to the corresponding node. This would tell the corresponding node to use the standby Home Agent, and the node would then issue an ARP request for the standby Home Agent's primary address. Thereafter the corresponding node would route packets through the standby Home Agent and would use the real standby Home Agent MAC address (as opposed to the group virtual MAC address). Thus, the corresponding node is again susceptible to failure if the standby Home Agent goes down. In this invention, this difficulty is overcome by disabling the group routers' capacity to issue ICMP redirect packets so that the host or corresponding node can never discover a router's primary MAC address. This disabling can be accomplished by simply programming the group routers such that they do not send out ICMP redirect packets when the standby protocol of this invention is running.

Various emulation functions of this invention can be configured on a router by programming or encoding special instructions. Such functions include (1) blocking ICMP redirect packets from being sent when the standby protocol is running, (2) changing a router's status in response to certain events, (3) the ability to control a router's preempt capacity, and (4) synchronizing the mobility binding tables of the active and standby Home Agents. These functions are generally implemented in the same manner as they would be in any general purpose router or digital computer. That is, the instructions for a function are processed by one or more processing units (such as a CPU chip) and stored in dynamic volatile memory, ROM, dynamic non-volatile memory, etc. In a preferred embodiment, configurations for IP addresses are stored in dynamic non-volatile memory of a router. Group addresses are hard-coded into the system software. Packet forwarding is supported by system software, and requires configuration information from dynamic non-volatile memory. Further, packet forwarding functions learn information from routing protocols which get stored in dynamic volatile memory.

6. Alternative Embodiments

Although the foregoing invention has been described in some detail for purposes of clarity of understanding, it will be apparent that certain changes and modifications may be practiced within the scope of the appended claims. For instance, although the specification has described routers, other entities used to tunnel packets to mobile nodes on remote network segments can be used as well. For example, bridges or other less intelligent packet switches may also employ the standby protocol of this invention. Further, the above-described preferred embodiment describes protocols in which redundant Home Agents are employed. Similar protocols may be applied to provide back up Foreign Agents as well.

What is claimed is:

1. In a standby Mobility Agent, a method of providing Mobile IP redundancy, the method comprising:
   determining that an active Mobility Agent, with which the standby Mobility Agent shares a virtual IP address known to a Mobile Node, is no longer acting as a Mobility Agent on a network segment for the Mobile Node;
   assuming the role of active Mobility Agent on the network segment using the shared virtual IP address, thereby handling registrations from the Mobile Node; and
   sending a list of registrations currently handled by the active Mobility Agent on the network segment to a new standby Mobility Agent on the network segment.

2. The method of claim 1, wherein prior to determining that an active Mobility Agent is no longer acting as a Mobility Agent, assuming the role of standby Mobility Agent.

3. The method of claim 1, further comprising registering the Mobile Node when it moves to a new location, wherein the Mobility Agent is a Home Agent.

4. The method of claim 3, wherein prior to determining that the active Mobility Agent is no longer acting as a Mobility Agent, receiving a registration entry from the active Mobility Agent, which registration entry specifies registration of the Mobile Node at a remote location.

5. The method of claim 4, further comprising adding the registration entry to a mobility binding table in the standby Mobility Agent.

6. The method of claim 1, wherein prior to determining that the active Mobility Agent is no longer acting as a Mobility Agent, receiving an entire mobility binding table or an entire visitor table specifying multiple registration entries from the active Mobility Agent.

7. The method of claim 1, wherein the standby Mobility Agent determines that the active Mobility Agent is no longer acting as a Mobility Agent by receiving a resign message from the active Mobility Agent.

8. The method of claim 1, wherein the standby Mobility Agent determines that the active Mobility Agent is no longer acting as a Mobility Agent by determining that no hello message has been received from the active Mobility Agent within a predefined length of time.

9. The method of claim 1, wherein when the standby Mobility Agent assumes the role of active Mobility Agent, it adopts the virtual IP address.

10. The method of claim 9, wherein when the standby Mobility Agent assumes the role of active Mobility Agent, it adopts a virtual MAC address.

11. The method of claim 1, further comprising preempting the active Mobility Agent if the active Mobility Agent has a lower priority than the standby Mobility Agent.

12. In an active Mobility Agent on a network segment, a method of maintaining Mobile IP operation, the method comprising:
   registering a Mobile Node;
   creating a registration entry internally for the Mobile Node; and
   sending a message notifying a standby Mobility Agent on the network segment of the registration, the active Mobility Agent and the standby Mobility Agent sharing a virtual IP address known to the Mobile Node.

13. The method of claim 12, further comprising:
   receiving a request from the standby Mobility Agent to dump registration entries for an entire mobility binding table, or a visitor table, containing multiple registration entries from the active Mobility Agent to the standby Mobility Agent; and
   dumping the registration entries for the mobility binding table from the active Mobility Agent to the standby Mobility Agent.

14. The method of claim 13, wherein dumping the registration entries mobility binding table is performed via UDP.

15. The method of claim 12, wherein the UDP message notifying the standby Mobility Agent of the registration is unicast.

16. The method of claim 12, further comprising periodically sending hello messages to the standby Mobility Agent, thereby notifying the standby Mobility Agent that the active Mobility Agent continues to function as the active Mobility Agent.

17. The method of claim 12, further comprising periodically sending hello messages to a standby group of routers, each configured to act as an active Mobility Agent, thereby notifying the standby group that the active Mobility Agent continues to function as the active Mobility Agent.

18. The method of claim 12, further comprising sending a resign message to the standby Mobility Agent before resigning the post of active Mobility Agent.

19. A router supporting Mobile IP for use with a network segment having a plurality of routers and a plurality of Mobile Nodes which register with an active Mobility Agent from the plurality of routers, the router comprising:

a memory;

a processor coupled to said memory;

one or more interfaces for sending and receiving data packets on a network, wherein said memory and said processor are adapted to provide (a) a primary router address and (b) a group virtual IP address which is adopted by the router when it becomes the active Mobility Agent of the network segment, and wherein said memory and said processor are adapted to (c) send registration updates to a standby Mobility Agent from among the plurality of routers.

20. The router of claim 19, wherein the memory and processor are further adapted to assume a status of standby Mobility Agent for backing up the active Mobility Agent.

21. The router of claim 19, wherein the memory and processor are further adapted to issue, through one of said one or more interfaces, at least one of a resign message to relinquish a status of active Mobility Agent or a hello message to notify other routers in the network segment that the active Mobility Agent is operating.

22. The router of claim 19, wherein the memory and processor are further adapted to issue a coup message, through said one or more interfaces, to notify a current active Mobility Agent when the router will attempt to become the active Mobility Agent.

23. The router of claim 22, wherein the memory and processor are further adapted to disable, at least temporarily, the router's ability to issue a coup message.

24. The router of claim 19, further comprising a priority specifying the router's relative likelihood of becoming the active Mobility Agent in comparison to other routers in the network segment.

25. The router of claim 19, further comprising:

means for detecting when a hello message has not been received from the current active Mobility Agent within a predetermined time; and means for automatically changing from the status of standby Mobility Agent to the status of active Mobility Agent when no hello message has been received from the current active router within said predetermined time.

26. The router of claim 25, wherein the hello message includes a router priority, a router status, and the group virtual address.

27. The router of claim 19, further comprising:

means for automatically inserting the group virtual address into an address filter when the router assumes the status of active Mobility Agent; and means for removing the group virtual address from the address filter when the router resigns the status of active Mobility Agent.

28. The router of claim 19, wherein the active Mobility Agent is an active Home Agent and wherein the standby Mobility Agent is a standby Home Agent.

29. In a router, a method of providing redundancy for a network segment, the method comprising:

assuming the status of standby router on the network segment to backup an active router on the network segment, with which the standby router shares a virtual IP address known to a host based at the network segment;

determining that the active router is no longer acting as an active router for the host;

assuming the role of active router for the shared virtual IP address, thereby handling packet exchange tasks for the host; and apprising a new standby router of an entry to a dynamic list specifying the status of one or more hosts based at the network segment.

30. The method of claim 29, wherein the apprising is performed via UDP communication.

31. The method of claim 29, wherein the dynamic list specifies at least one of a registration for a Mobile IP Mobile Node, a visitor entry for a Mobile IP Mobile Node, an address translation for a network node employing Network Address Translation, address bindings in Dynamic Host Configuration Protocol (DHCP) servers, dynamic ACL in Reflexive Access List, and TCP and GTP layer context in GPRS support nodes: SGSN & GGSN.

* * * * *